US010034297B2

(12) United States Patent
Gandhi

(10) Patent No.: US 10,034,297 B2
(45) Date of Patent: Jul. 24, 2018

(54) SYSTEM AND METHOD FOR REDUCING EXPOSURE OF HUMAN TO RADIO FREQUENCY RADIATION

(71) Applicant: Rakuvisions LLC, Wilmington, DE (US)

(72) Inventor: Rakuram Gandhi, Petaling Jaya (MY)

(73) Assignee: Rakuram Ghandi, Petaling Jaya (MY)

( * ) Notice: Subject to any disclaimer, the term of this patent is extended or adjusted under 35 U.S.C. 154(b) by 191 days.

(21) Appl. No.: 15/133,868

(22) Filed: Apr. 20, 2016

(65) Prior Publication Data

US 2017/0311330 A1 Oct. 26, 2017

(51) Int. Cl.
| | |
|---|---|
| *H04W 80/04* | (2009.01) |
| *H04W 72/08* | (2009.01) |
| *H04B 1/3827* | (2015.01) |
| *H04W 12/06* | (2009.01) |
| *H04W 52/24* | (2009.01) |
| *H04W 76/23* | (2018.01) |

(52) U.S. Cl.
CPC ........ *H04W 72/082* (2013.01); *H04B 1/3838* (2013.01); *H04W 12/06* (2013.01); *H04W 52/243* (2013.01); *H04W 76/23* (2018.02)

(58) Field of Classification Search
CPC ... H04W 12/06; H04W 52/243; H04W 76/04; H04B 1/3838
See application file for complete search history.

(56) References Cited

U.S. PATENT DOCUMENTS

| | | | | |
|---|---|---|---|---|
| 2011/0312288 A1* | 12/2011 | Fu | ............ | H04B 1/406 455/88 |
| 2013/0051261 A1* | 2/2013 | Kazmi | ............ | H04B 7/0693 370/252 |
| 2014/0153390 A1* | 6/2014 | Ishii | ............ | H04W 76/023 370/230 |
| 2014/0160950 A1* | 6/2014 | Vasudevan | ............ | H04W 76/043 370/252 |
| 2015/0036656 A1* | 2/2015 | McCarthy | ............ | H04B 7/0689 370/331 |
| 2015/0271733 A1* | 9/2015 | Li | ............ | H04W 76/043 455/445 |
| 2015/0333788 A1* | 11/2015 | Ding | ............ | H04B 1/3838 455/575.5 |

(Continued)

*Primary Examiner* — Andrew Lee
(74) *Attorney, Agent, or Firm* — Workman Nydegger

(57) ABSTRACT

The present invention for reducing exposure of human to radio frequency radiation comprising a wireless device which comprises a high power radio frequency (HPRF) module, and a low power communications (LPC) module coupled to a switch and further coupled to a control unit and to the baseband unit or to the application processor of the hybrid wireless device; and a high power radio frequency-low power communications (HPRF-LPC) device which comprises a high power radio frequency (HPRF) module coupled to a processor and further coupled to a low power communications (LPC) module. Replication of the HPRF module in the wireless device and its function into the HPRF-LPC device enables communications between the HPRF-LPC device located at a distance away from the human head with a base station and reduces RF energy exposure. The present invention significantly reduces the RF exposure contributing to head SAR of 0.16 W/kg or lower averaged over one gram of tissue.

40 Claims, 23 Drawing Sheets

(56) References Cited

U.S. PATENT DOCUMENTS

| | | | |
|---|---|---|---|
| 2016/0029429 A1* | 1/2016 | Peng | H04W 36/00 370/329 |
| 2016/0037322 A1* | 2/2016 | Nguyen | H04W 8/005 370/329 |
| 2016/0316425 A1* | 10/2016 | Cili | H04W 24/08 |
| 2017/0118724 A1* | 4/2017 | Mohaupt | H04L 43/16 |
| 2017/0288842 A1* | 10/2017 | Lim | H04L 5/14 |

* cited by examiner

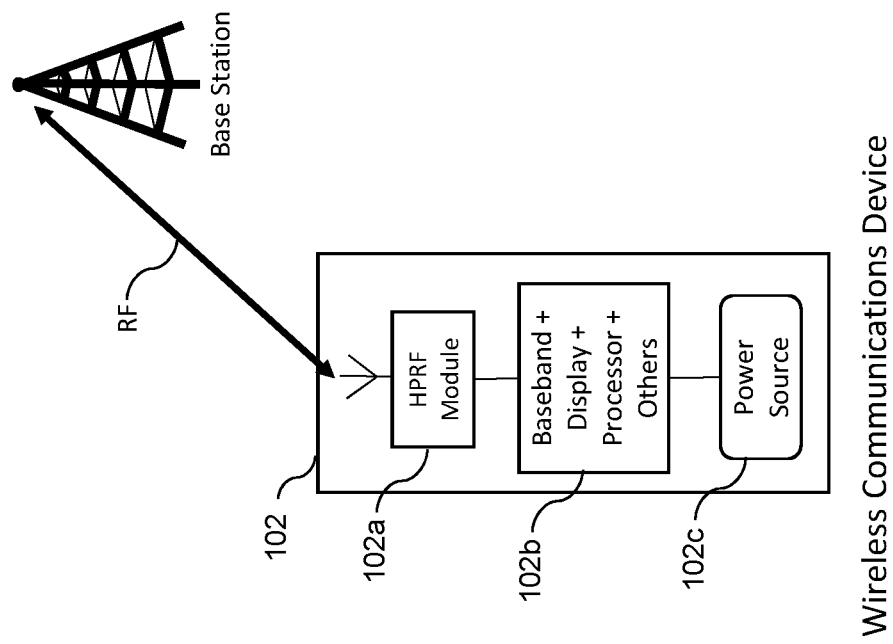
FIG. 1.0

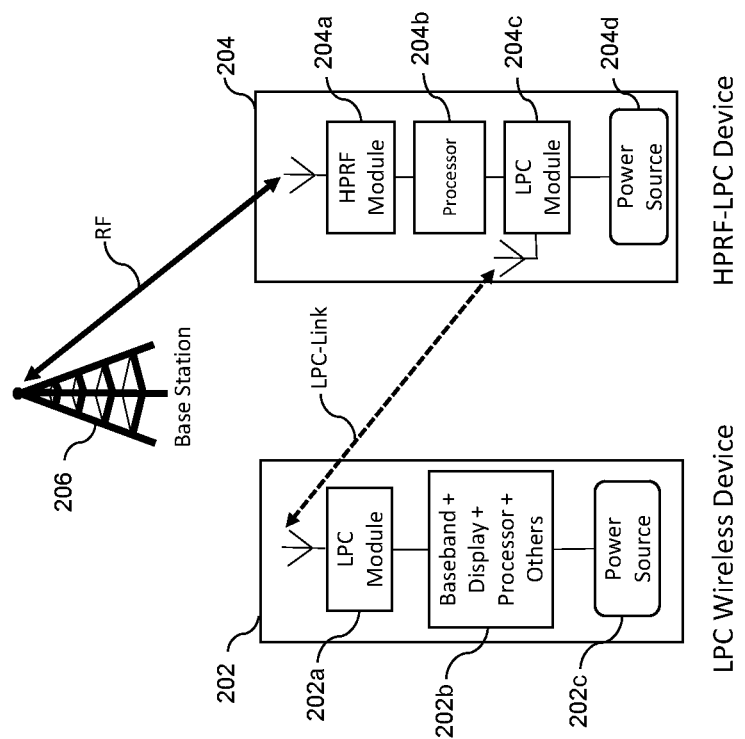
FIG. 2.0

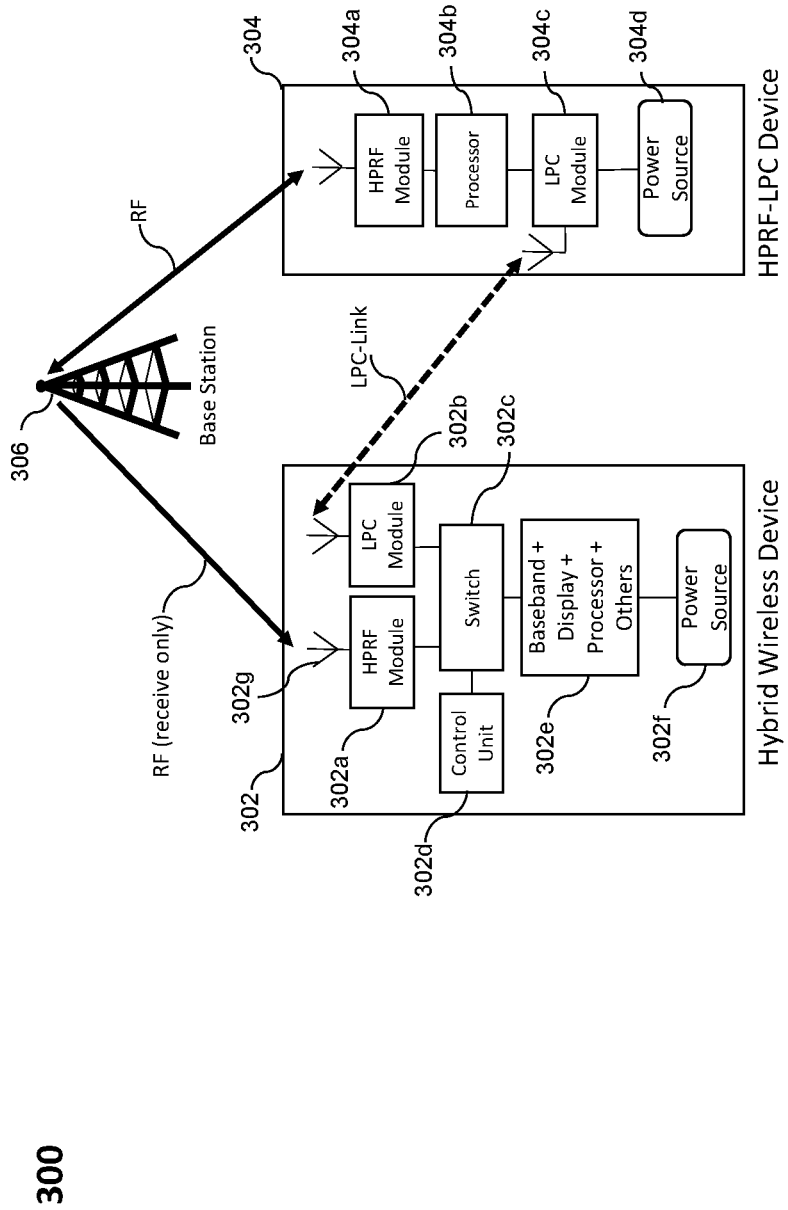
FIG. 3.0

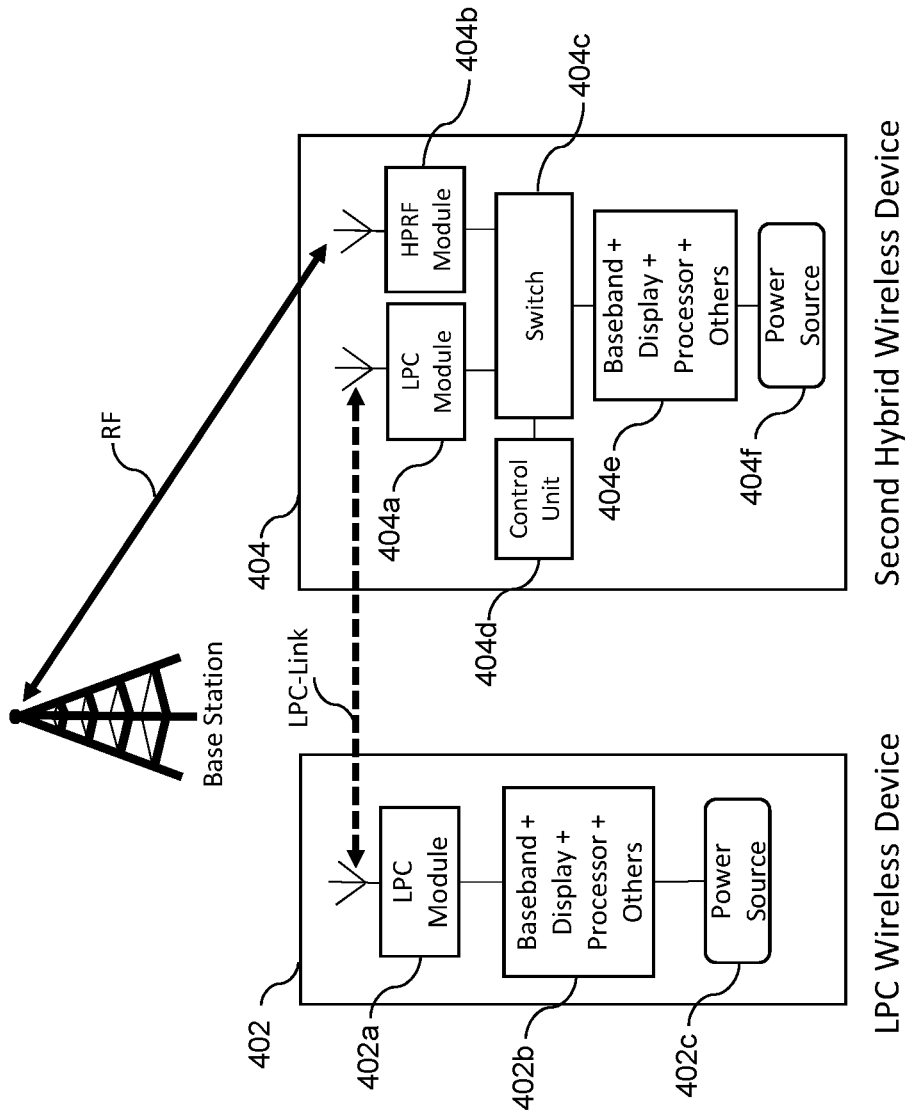
FIG. 4.0

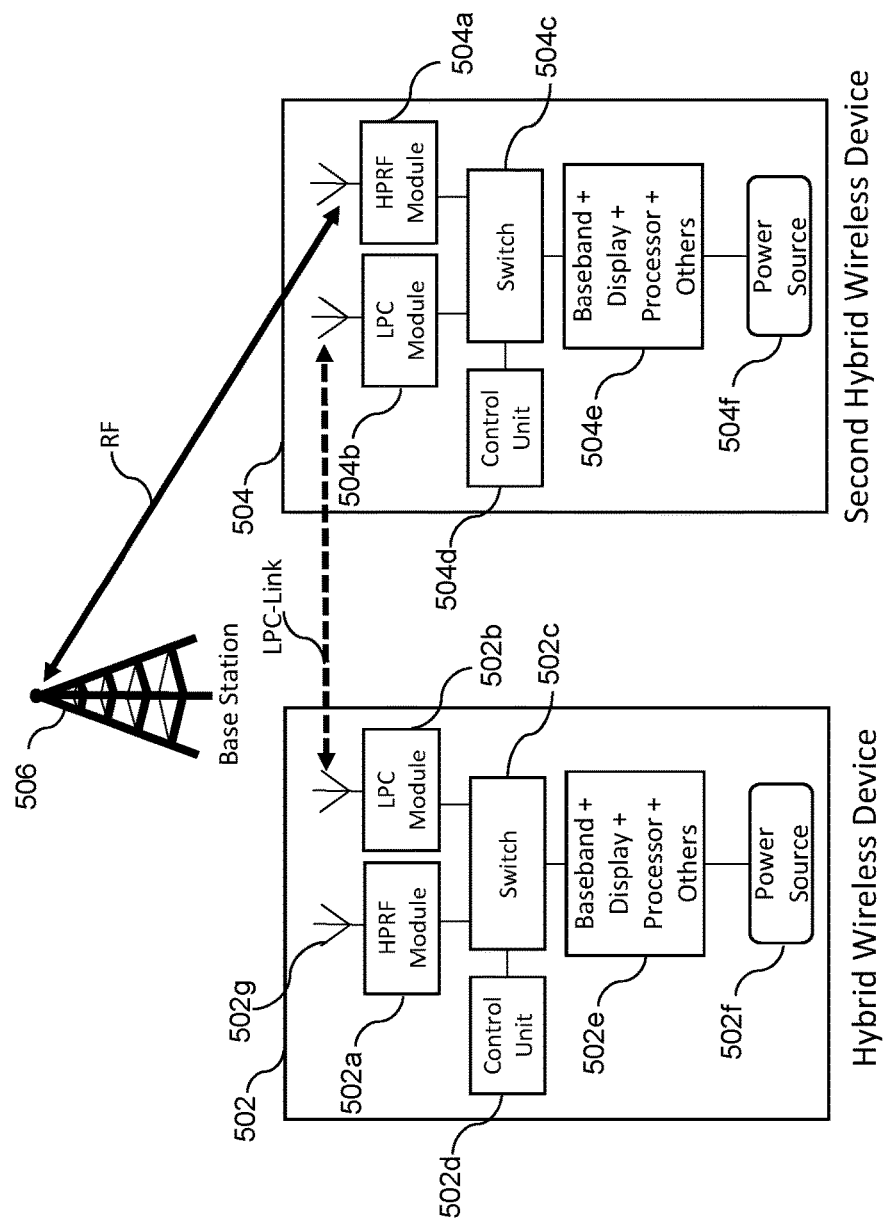
FIG. 5.0

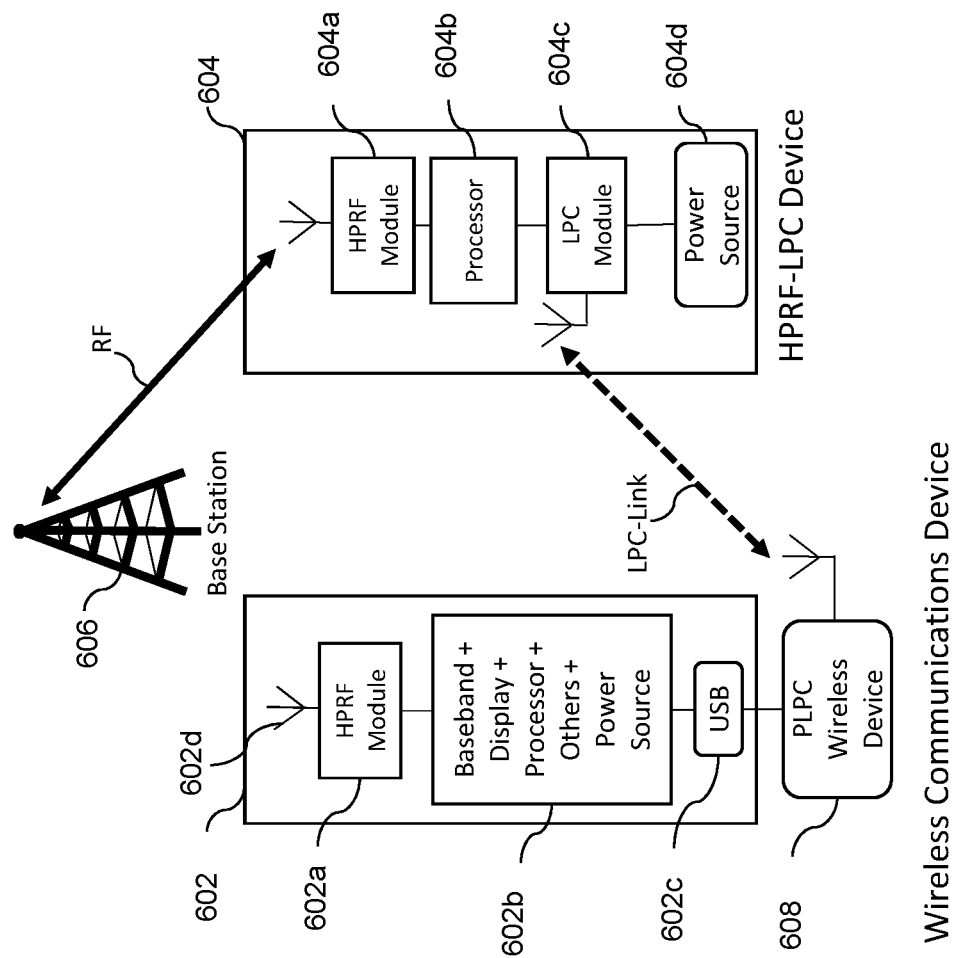
FIG. 6.0

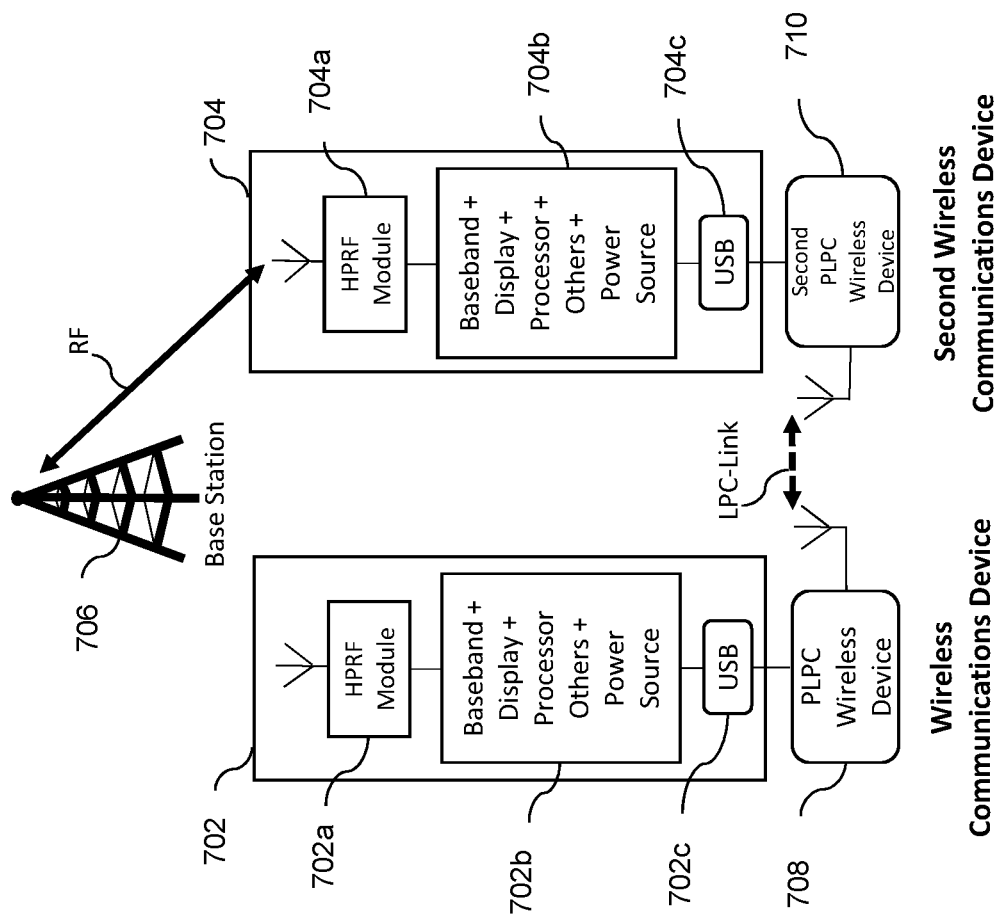
FIG. 7.0

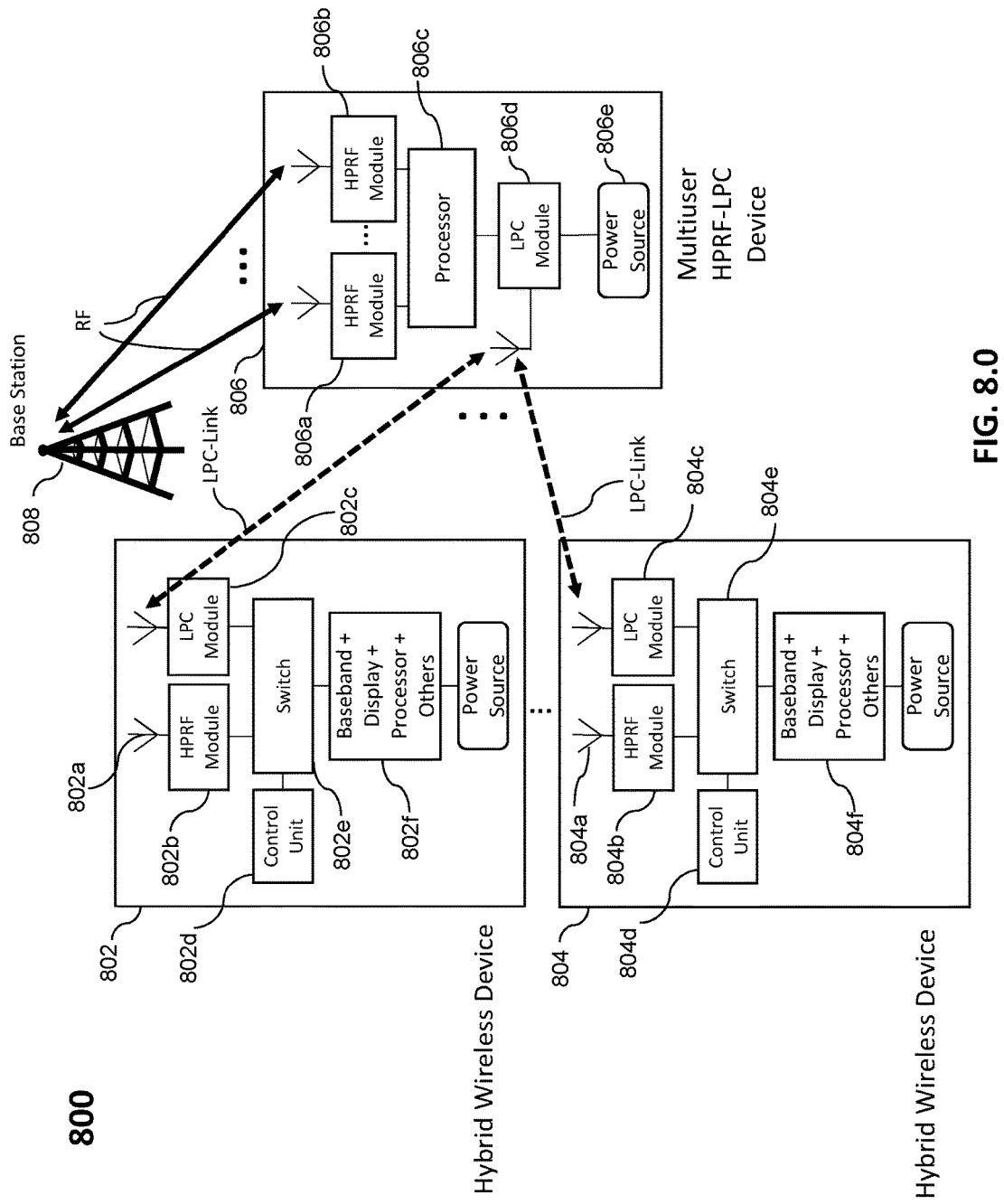
FIG. 8.0

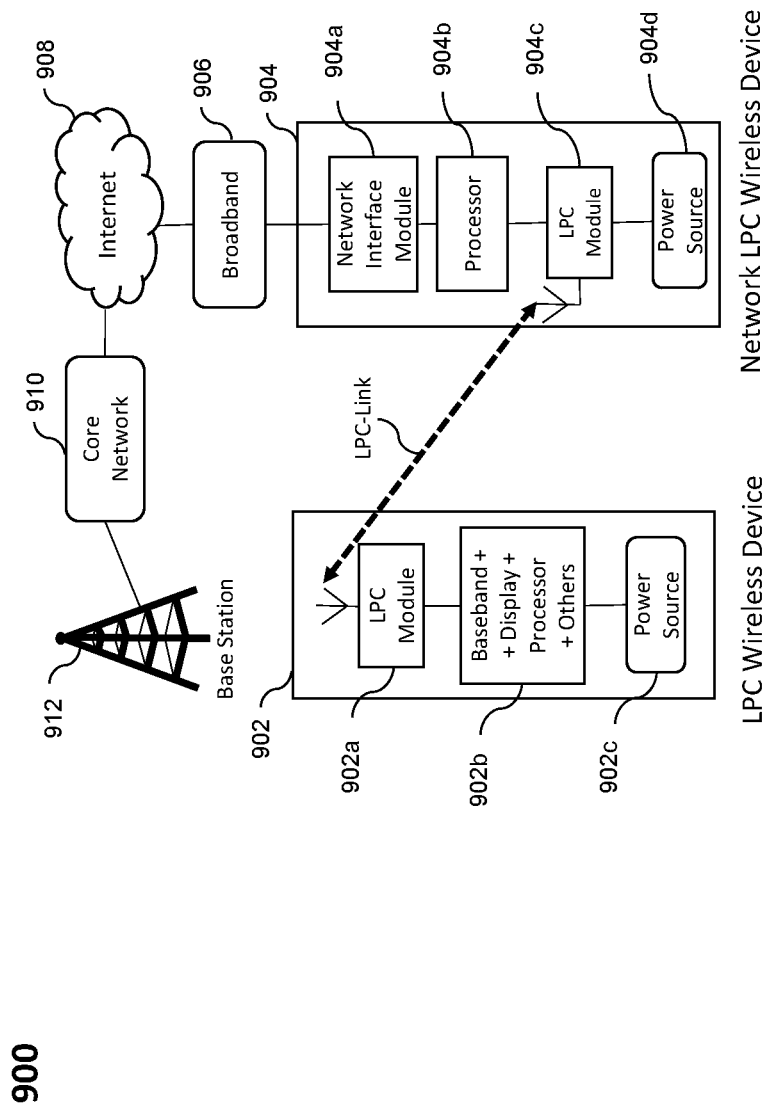
FIG. 9.0

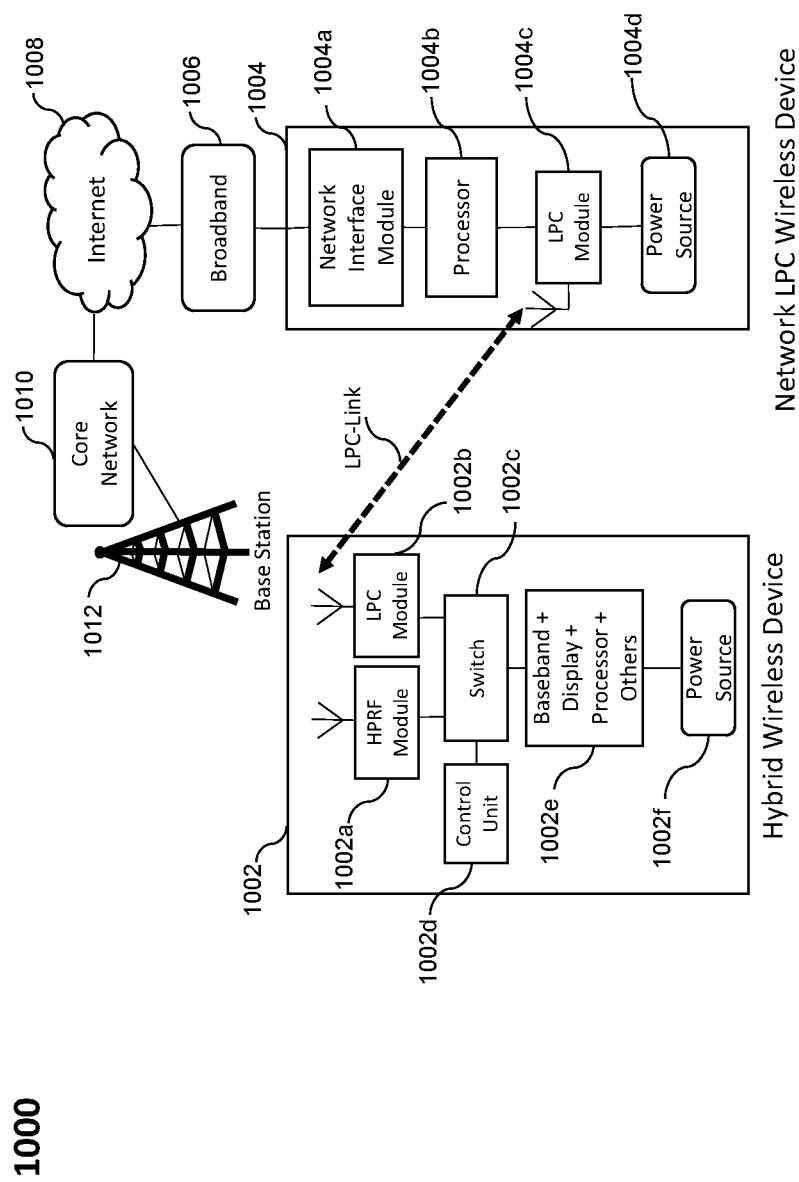
FIG. 10.0

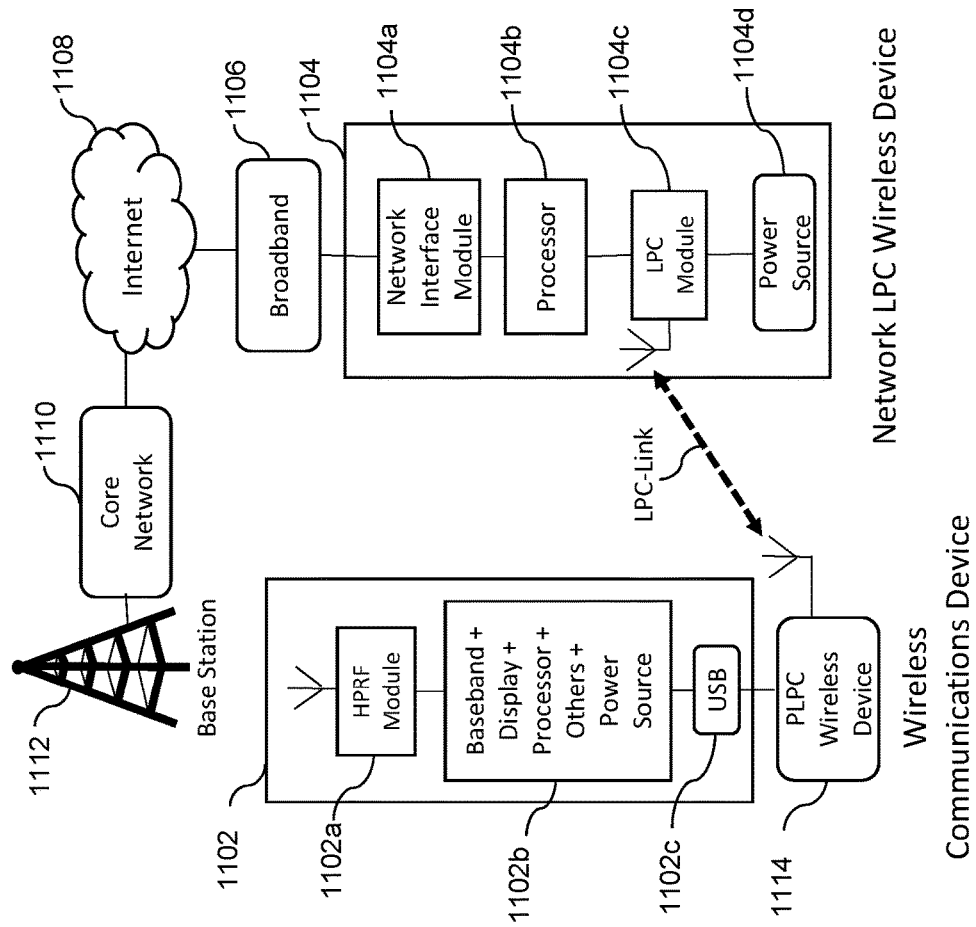
FIG. 11.0

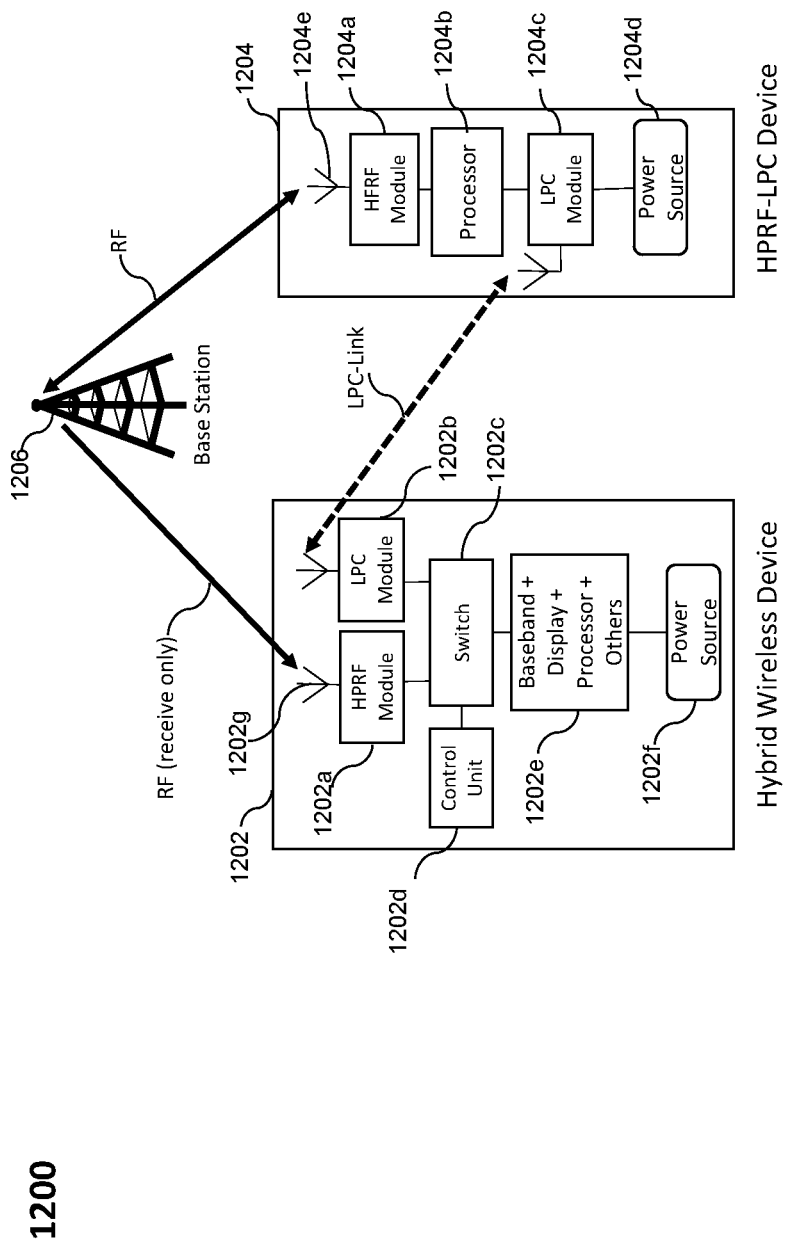
FIG. 12.0

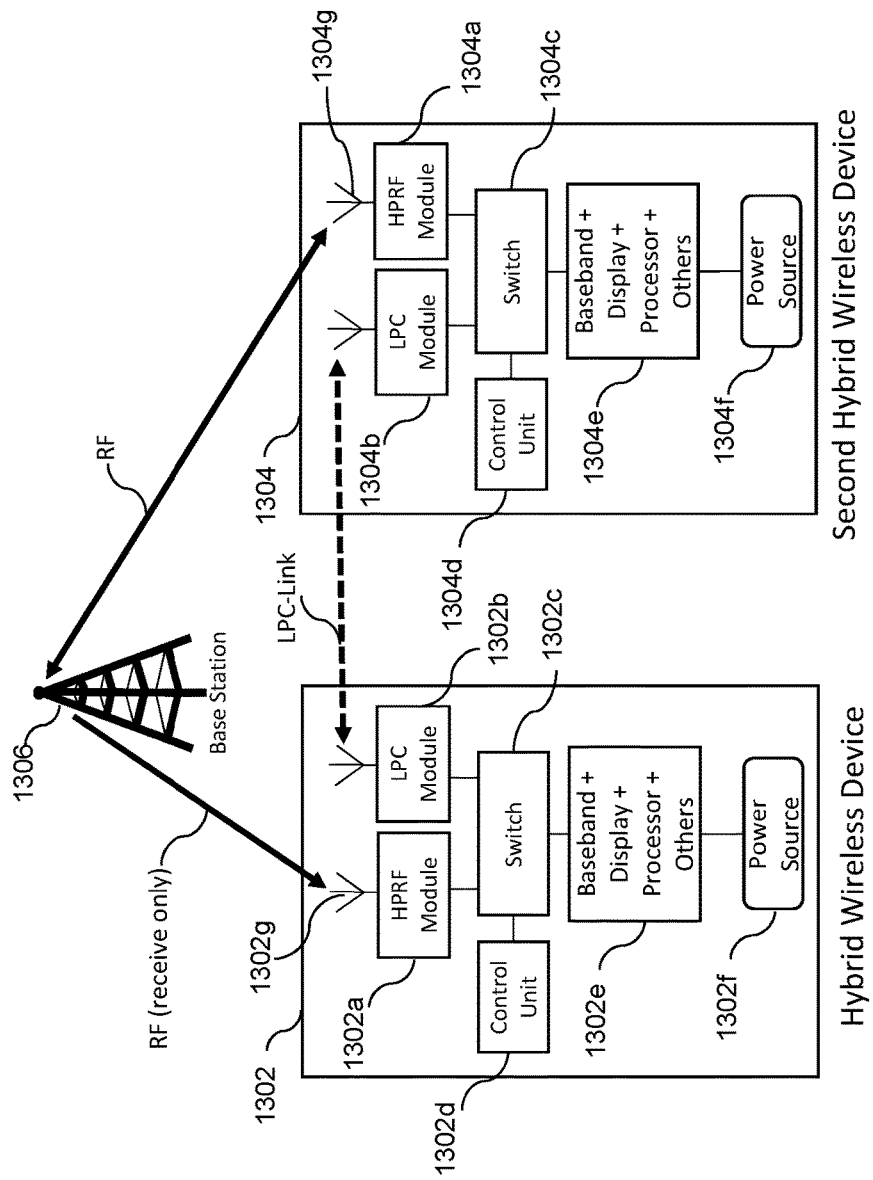
FIG. 13.0

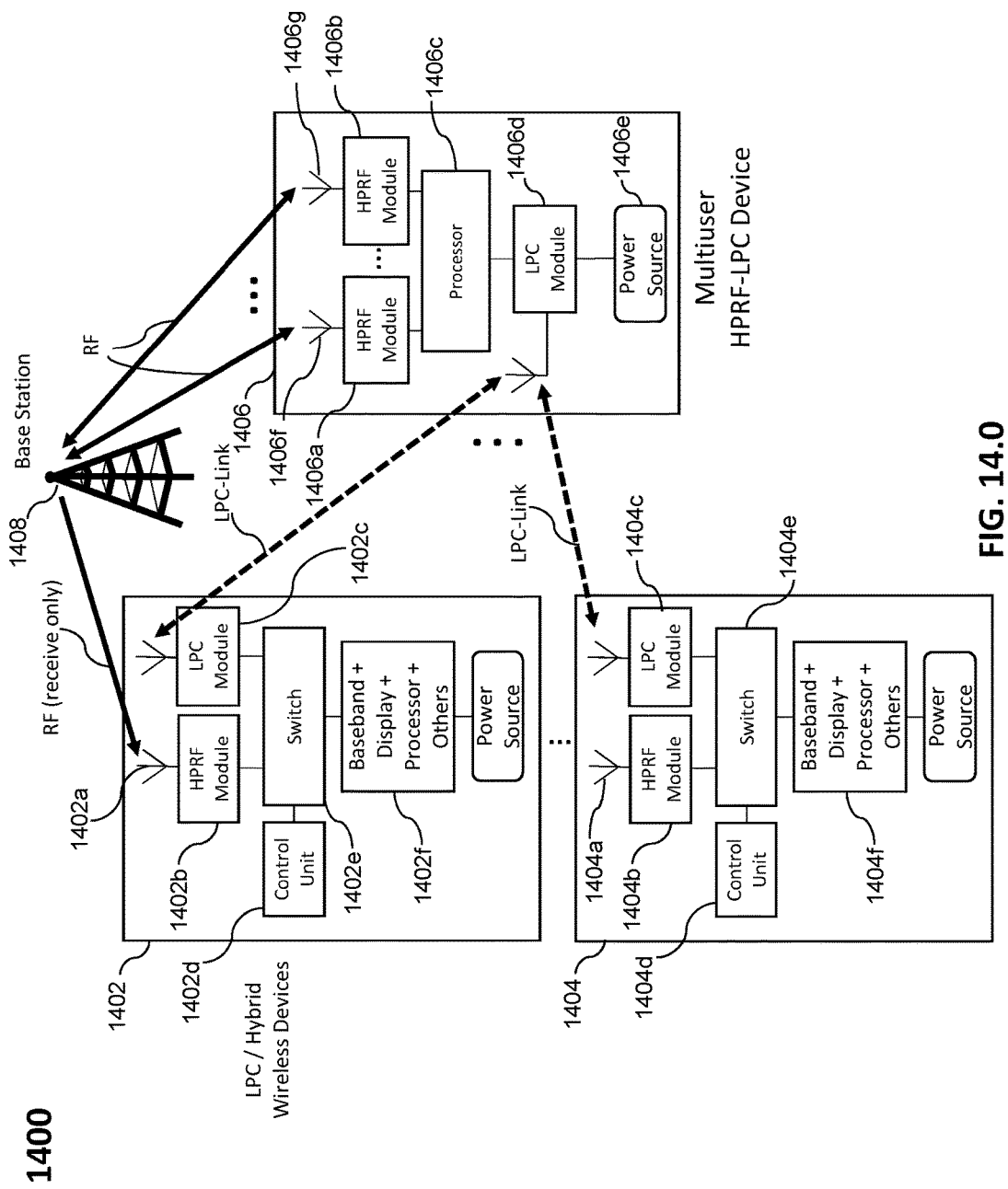
FIG. 14.0

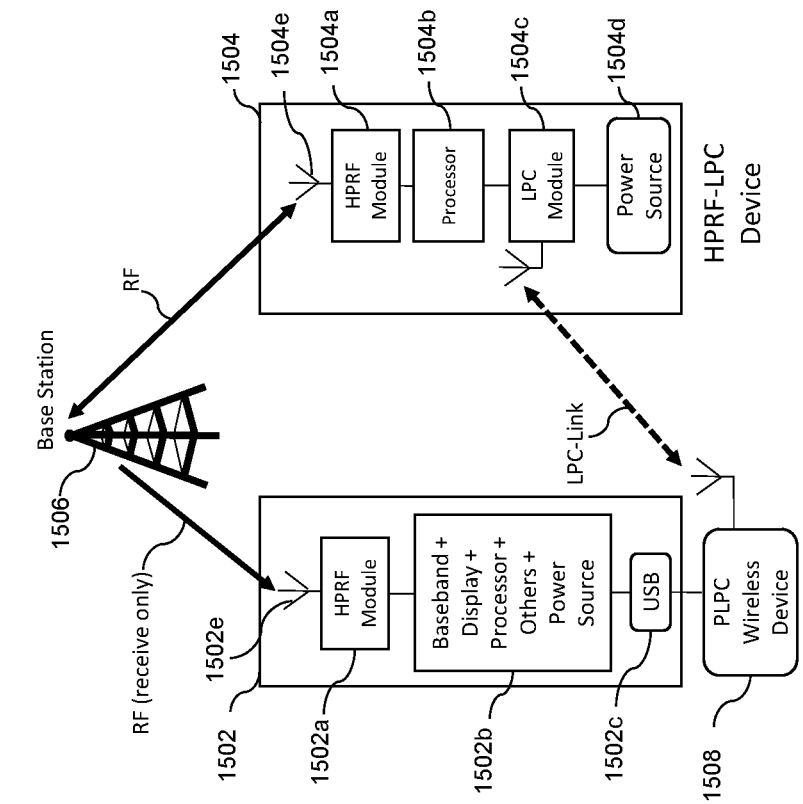
FIG. 15.0

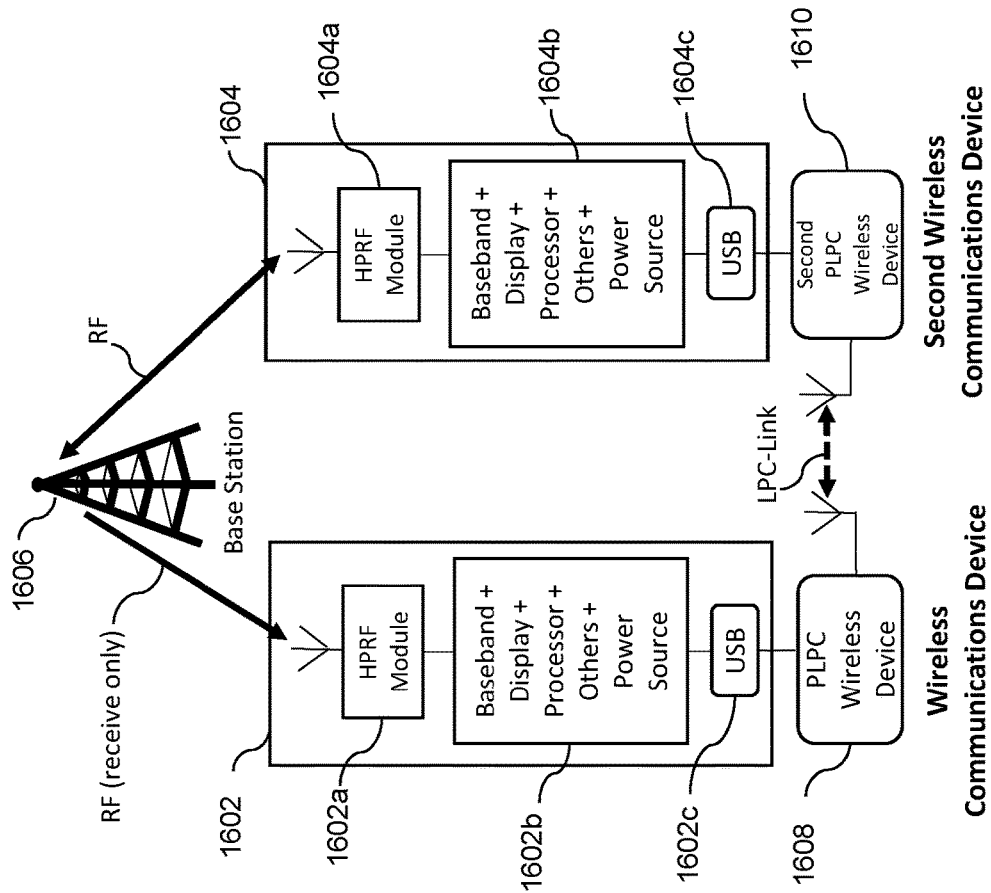
FIG. 16.0

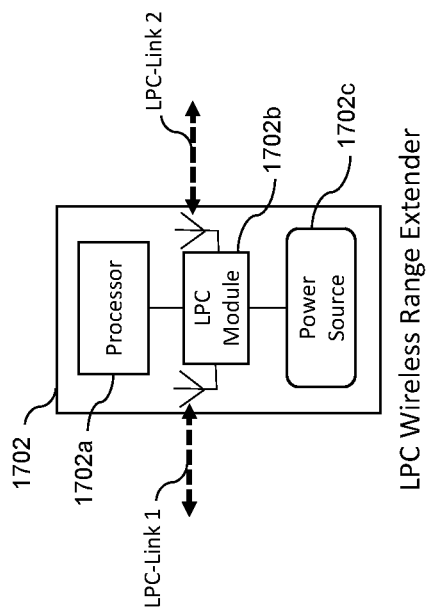
FIG. 17.0

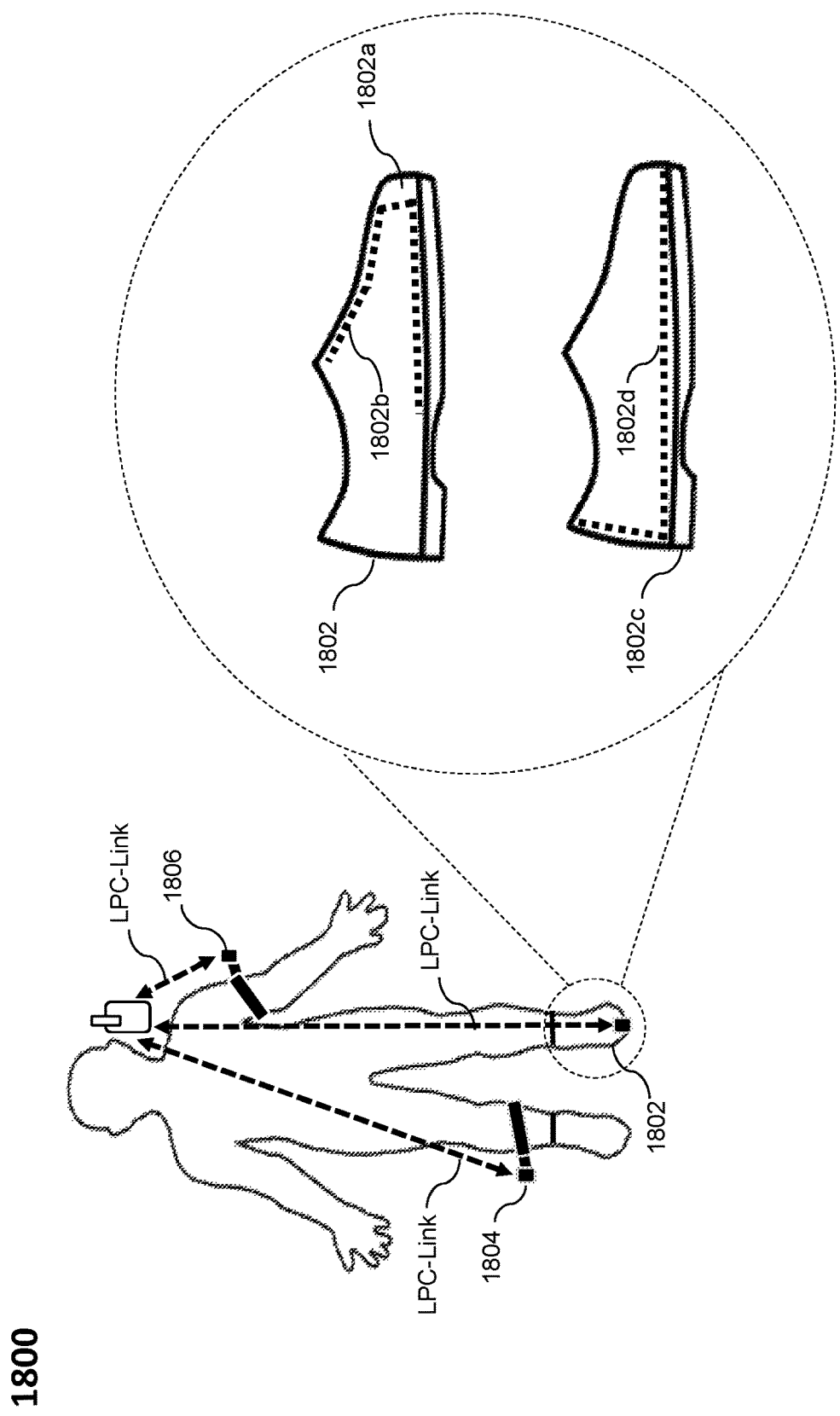
FIG. 18.0

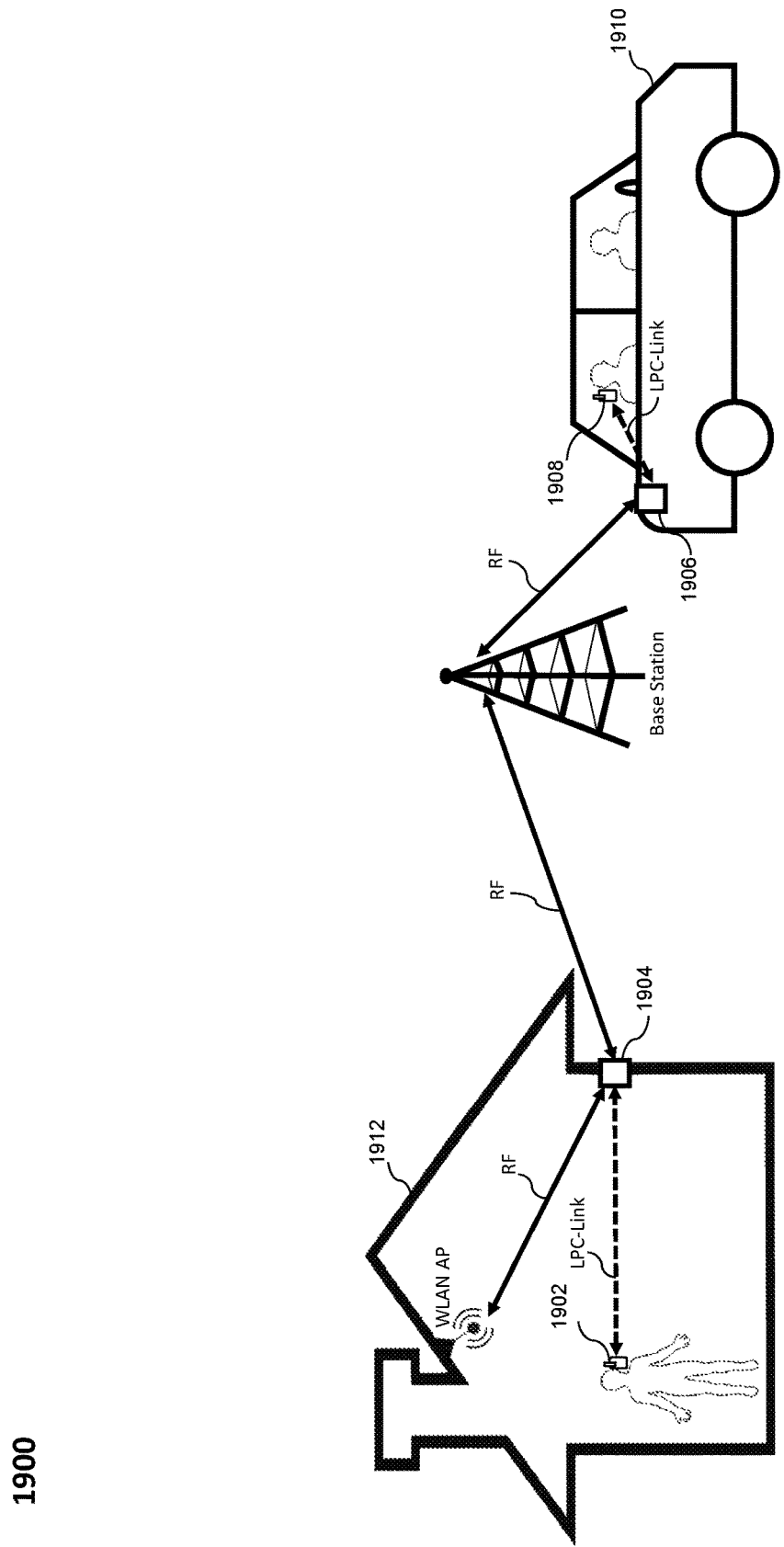
FIG. 19.0

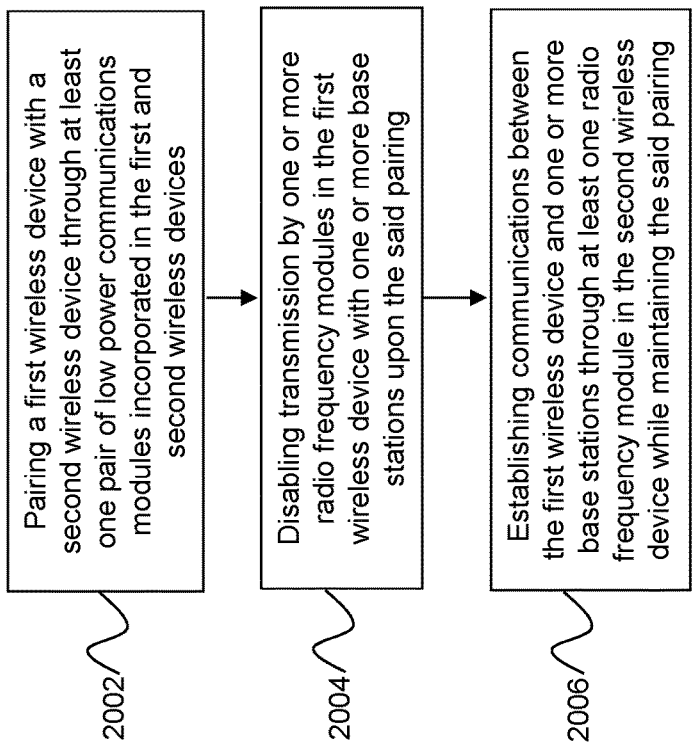
FIG. 20.0

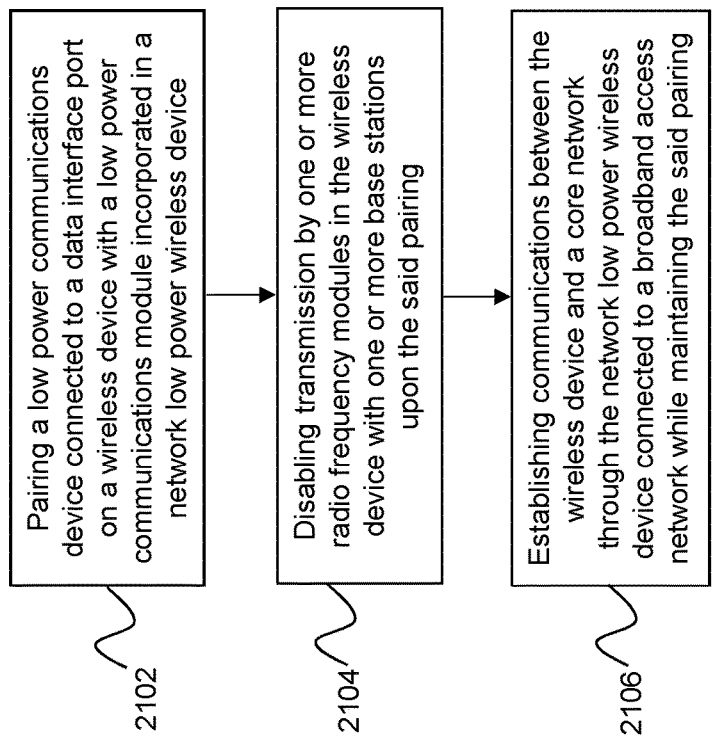
FIG. 21.0

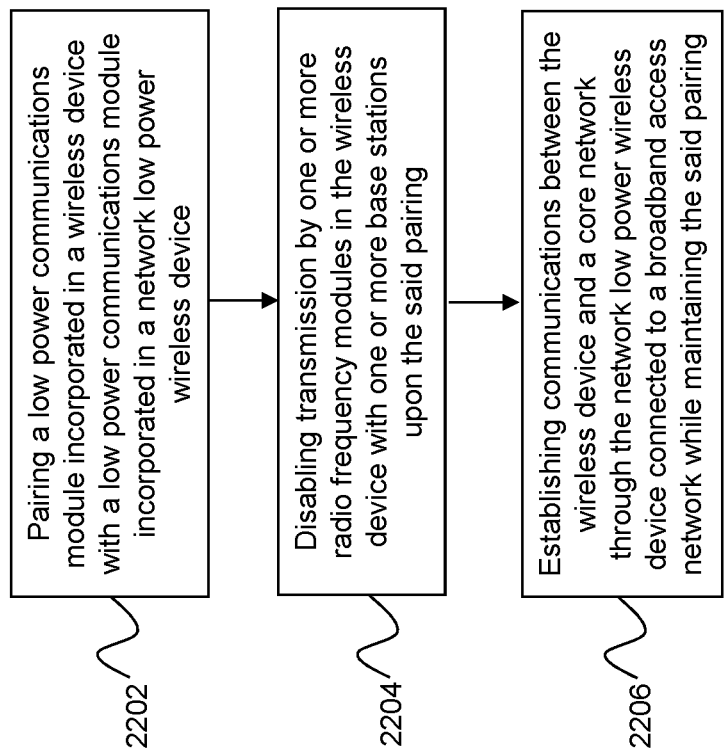
FIG. 22.0

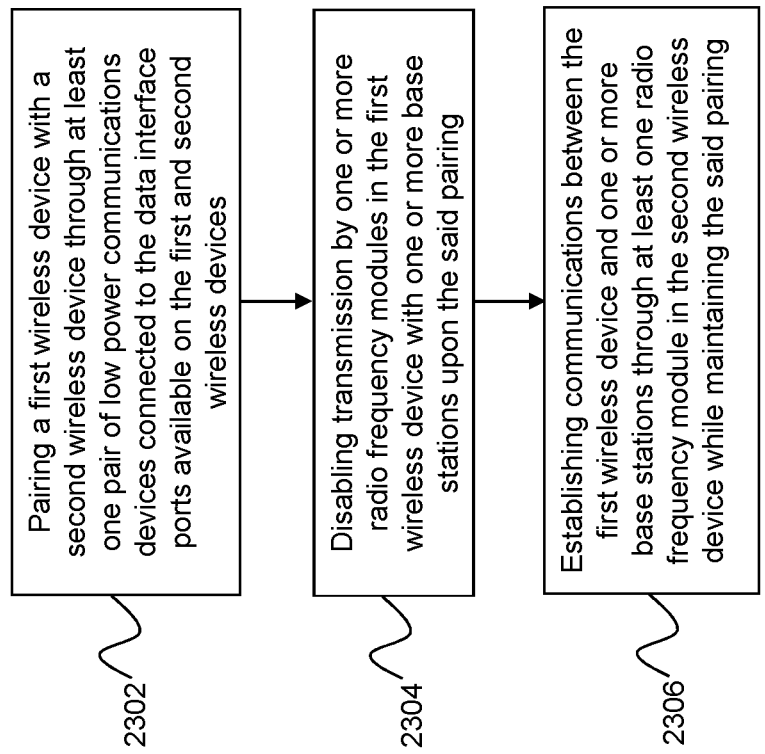
FIG. 23.0

SYSTEM AND METHOD FOR REDUCING EXPOSURE OF HUMAN TO RADIO FREQUENCY RADIATION

FIELD OF INVENTION

The present invention provides a system and method to reduce exposure of human to radio frequency radiation. In particular, the present invention decouples and duplicates the high power radio frequency (HPRF) module along with its associated antenna(s) from the wireless device (e.g. cellular phone). The HPRF module along with its associated antenna(s) is located at a distance away from the human head while allowing this HPRF module to communicate with the wireless device using a low power communications (LPC) link. By doing so, the SAR value of the wireless device is significantly reduced, which in turn reduces the RF exposure to the human.

BACKGROUND ART

Specific absorption rate, SAR is a measure of the amount of radio frequency energy that is absorbed by tissues in the human body and expressed in watts per kg (W/kg). The SAR measurement is used to determine the capability of wireless devices, such as cell phones including smart phones, cordless phones, Laptop or Notebook or Netbook and Tablet Devices, including hand-held tablets and devices that are designed primarily for interactive hand-held use next to or nearby the human body, PTT two-way radios and universal serial bus dongles transceivers complies with the safety standards or guidelines. Currently, user's who are concerned with the adequacy of the SAR requirement or intends to reduce the exposure to radio frequency places the relevant wireless device away from the head or body by using a speakerphone or hands-free accessory.

Existing compliance approval regulations on controlled telecommunications requires radio frequency devices specifically radio frequency based wireless device manufacturers to comply with safety standards or guidelines. For example, the Federal Communications Commission, FCC in the United States of America adopted guidelines and requires compliance with the 1.6 W/kg safety standards whereby testing of the wireless devices are conducted under conditions of maximum power usage. The compliance requirements are stringent and difficult to be complied by the wireless device manufacturers especially when these devices are used in close proximity to the body or head as these wireless devices incorporates numerous combinations of signal modulations, channel bandwidths, radio frequency power, frequency bands, data rates and multiple antenna transmission schemes which pose a concern on potential safety hazards of human exposure to radio frequency energy.

United States Patent Application Publication No. US 2013/0099956 A1 (US 956 Publication) entitled "Apparatus to Reduce Specific Absorption Rate" having a filing date of 24 Oct. 2011 (Applicant: LSI Corporation) relates to protective devices for protection of radio frequency energy specifically protective materials configured to absorb radiated energy of wireless communication devices. In the US 956 Publication, it is provided that a user is protected from potential health risks from emitted radio frequency energy from a wireless handset or other device by reducing Specific Absorption Rate, SAR of the device while avoiding, or even improving, the radiation pattern of the antenna through protective materials. The examples of protective materials as disclosed in the US 956 Publication includes a hat, cap or other covering of a device user's upper body which includes a dual-layer structure comprising of carbon-loaded, open cell foam with a metalized layer. Further, it is stated in the US 956 Publication that the dual-layer structure is embedded in, for example, a hat with the carbon loaded foam facing away from the user's head. The covering as provided in the protective material of the US 956 Publication provides for RF protection of the user to reduce SAR while maintaining good return loss characteristics which avoids a negative impact on the antenna radiation pattern of the wireless device.

United States Patent Application Publication No. US 2014/0051480 A1 (US 480 Publication) entitled "Mobile Phone Microwave Radiation Protection" having a filing date of 16 Aug. 2013 (Applicant: John Fred Cruz) relates to protection of mobile phone from microwave radiation. The invention as disclosed in the US 480 Publication is used to reflect and block significant levels of microwave radio signals directed out of the front of the mobile phone as microwave radio signals are used to transmit data or voice between mobile phone and cellular towers. The invention as disclosed in the US 480 Publication further provides a protective shield when the front of the mobile phone is held next to the head or body when microwave radiation absorption takes place into the body as the shield is place on the front of the phone.

Another published patent application, United States Patent Application Publication No. US 2015/0333788 A1 (the US 788 Publication) entitled "Mobile Terminal and Specific Absorption Rate Reduction Method" having a filing date of 20 Aug. 2013 (Applicant: ZTE Corporation) describes a mobile terminal and a method for reducing a specific absorption rate, in a precondition of ensuring high-quality communication, a SAR value is reduced and decreasing the radiation hazard of the mobile terminal to the human body and human head. Further, in the US 788 Publication, the mobile terminal includes a control unit which is connected to an input unit, a memory and a switch, an antenna group containing multiple antennas, and the switch connected to each antenna and the radio-frequency circuit; wherein the input unit is configured to detect a location of the mobile terminal relative to a user, and notify the control unit of the location; the memory is configured to store location-specific absorption rate corresponding information of each antenna; and the control unit is configured to according to the location, search the location-specific absorption rate corresponding information for a specific absorption rate of each antenna at the location obtained, select an antenna according to the specific absorption rate of each antenna at the location and control the switch to connect the selected antenna with the radio-frequency circuit.

As there is a concern on potential safety hazards of human exposure to radio frequency energy from wireless devices, there is a need for a system and method to address and reduce the exposure of human to radio frequency radiation.

SUMMARY OF INVENTION

The present invention provides a system and method to reduce exposure of human to radio frequency radiation. In particular, the present invention decouples and duplicates the high power radio frequency (HPRF) module along with its associated antenna(s) from the wireless device.

One aspect of the invention provides a system (300) for reducing exposure of human to radio frequency radiation. The system comprising a hybrid wireless device (302) which comprises a high power radio frequency (HPRF) module (302a), and a low power communications (LPC) module (302b) coupled to a switch (302c) and further coupled to a control unit (302d) and to a baseband unit or an application processor in the hybrid wireless device (302e); and a high power radio frequency-low power communications (HPRF-LPC) device (304) which comprises a high power radio frequency (HPRF) module (304a) coupled to a processor (304b) and further coupled to a low power communications (LPC) module (304c). The hybrid wireless device (302) is further paired with the HPRF-LPC device (304) through a low power communications link (LPC-Link) established between the LPC module (302b) in the hybrid wireless device (302) and the LPC module (304c) in the HPRF-LPC device (304) whereby upon pairing of the hybrid wireless device (302) and the HPRF-LPC device (304), direct communications from the HPRF module (302a) to a base station (306) shall cease while communications between said hybrid wireless device (302) and the base station (306) will be established via the HPRF-LPC Device (304).

Another aspect of the invention provides that the HPRF-LPC device (304) replicates function of the HPRF module (302a) found in the hybrid wireless device (302) and the LPC-module (304c) in the HPRF-LPC device (304) communicates with LPC-module (302b) in the hybrid wireless device (302) while the low power communications (LPC) modules (302b, 304c) incorporates transceivers utilizing ultra wideband (UWB) technologies and the low power communications (LPC) module (302b) will contribute to the head Specific Absorption Rate (SAR) level of 0.16 watts per kilogram (W/kg) or lower averaged over one gram of tissue.

A further aspect of the invention provides that said HPRF-LPC device (304) is placed at a distance away from the human head whereby the placement (1800) of the HPRF-LPC may include heels on footwear, sole of footwear, within toe box of a footwear, or may be placed on other parts of the body distance from the hybrid wireless device.

Yet another aspect of the invention provides that placement of the HPRF-LPC device may further be placed in buildings or vehicles with presence of radio frequency connectivity (1900, 1904, 1906).

Still another aspect of the invention provides that the HPRF-LPC device (304) is either battery powered (304d) or powered through external regulator or chargeable through energy harvesting techniques.

A further aspect of the invention provides that the control unit (302d) in the hybrid wireless device (302) is configured to control the switch (302c) which selects the HPRF Module (302a) and LPC Module (302b).

Yet another aspect of the invention provides that the hybrid wireless device (302, 202) may exclude the HPRF module (302a), switch (302c) and control unit (302d) with the LPC module (302b, 202a) now being directly coupled to a baseband unit or an application processor in the hybrid wireless device (302e).

Still another aspect of the invention provides that the HPRF-LPC device (304) may be replaced by a second hybrid wireless device (400, 404).

A further aspect of the invention provides that the system of the present invention may further be configured by replacing the high power radio frequency-low power communications (HPRF-LPC) device (304) with a hybrid wireless device (504) which enables communications between two hybrid wireless devices (502, 504).

Another aspect of the invention provides that the HPRF-LPC device (304) comprises two or more HPRF modules (304a, 800) coupled to a processor (304b, 806c) allowing for one or more wireless devices (302, 802, 804) to pair with the HPRF-LPC device via LPC-Links.

A further aspect of the invention provides that the HPRF module (304a) in the HPRF-LPC device (304) is replaced with a network interface module (1004).

Yet another aspect of the invention provides that the network interface module (1004) is connected to a broadband access network and to Internet and to a core network of the service provider.

Still another aspect of the invention provides that the HPRF module (302a), control unit (302d) and the switch (302c) is removed from the hybrid wireless device (302) whereby the LPC module (302b) is now coupled directly to the baseband unit or to the application processor in the wireless device (302e) (900).

A further aspect of the invention provides that the HPRF module (302a) in the hybrid wireless device (302) is allowed to use its associated antenna(s) (302g) to receive RF signal from the base station (306).

Yet another aspect of the invention provides that the control unit (302d) coupled with the switch (302c) will route the data received from both the HPRF module (302a) and LPC module (302b) to baseband unit or application processor in the hybrid wireless device (302) for further processing to extract gains of receive spatial diversity and spatial multiplexing.

Still another aspect of the invention provides that the HPRF-LPC device (304) is replaced by a second hybrid wireless device (1300, 1304).

A further aspect of the invention provides that the HPRF-LPC device (304) comprises two or more HPRF modules (304a) allowing for one or more wireless devices (302) to pair with the HPRF-LPC device via LPC-links (1400).

A further aspect of the invention provides a system (600) for reducing exposure of human to radio frequency radiation. The system comprising a pluggable low power communications (PLPC) wireless device (608) connected to a data interface port (602c) that is available on a wireless communications device (602); and a high power radio frequency-low power communications (HPRF-LPC) device (604) which comprises a high power radio frequency (HPRF) module (604a) coupled to a processor (604b) and further coupled to a low power communications (LPC) module (604c). The wireless communications device (602) is paired with the HPRF-LPC device (604) through a low power communications link (LPC-Link) established between the pluggable low power communications (PLPC) wireless device (608) and the LPC module (604c) whereby upon pairing of the wireless communications device (602) and the HPRF-LPC device (604), direct communications from the HPRF module (602a) to the base station shall cease while communications between said wireless communications device (602) and the base station (606) will be established via the HPRF-LPC Device (604) and further upon pairing of the PLPC wireless device (608) with the HPRF-LPC device (604), PLPC wireless device (608) will send control commands to the wireless communications device (602) through the data interface port, USB (602c) to disable the HPRF module (602a).

A further aspect of the invention provides that the pluggable low power communications (PLPC) wireless device (608) will send and receive to and from the wireless communications device (602) speech, audio, text as well as video, images and internet data through a hands-free function available in the wireless communications device (602).

Still another aspect of the invention provides that the pluggable low power communications (PLPC) wireless device (608) will receive authentication information from the wireless communications device (602) which is then relayed by the PLPC wireless device (608) to HPRF-LPC device (604) to authenticate user for accessing base station (606).

Yet another aspect of the invention provides that the pluggable low power communications (PLPC) wireless device (608) further comprises an authentication module for authenticating user access with base station (606) via the HPRF-LPC device (604).

Still another aspect of the invention provides that the authentication module further comprises a subscriber identity module (SIM), said SIM may be a physical SIM or an electronic SIM and the authentication module further comprises a memory module to contain information for authenticating user access to a wireless LAN access point (WLAN-AP).

A further aspect of the invention provides that establishment of communications between said wireless communications device (602) and the base station (606) via the HPRF-LPC Device (604) further comprising authenticating user access to the base station through transmission via the HPRF module (602*a*) in the wireless communications device (602) when other authentication options are not available.

Yet another aspect of the invention provides that the HPRF-LPC device (604) is replaced by a second wireless device (704) with a PLPC wireless device (710) plugged in.

Still another aspect of the invention provides that an LPC-Link is further established between the PLPC wireless device (708) and the second PLPC wireless device (710).

Yet another aspect of the invention provides that the second wireless communications device (704) will transmit information for authenticating user access to the base station when other authentication options are not available.

A further aspect of the invention provides that the HPRF module (604*a*) in the HPRF-LPC device (604) is replaced with a network interface module and the network interface module is connected to a broadband access network and to Internet and to a core network of a service provider.

Yet another aspect of the invention provides that the control unit (302*d*) coupled with the switch (302*c*) will route the data received from both the HPRF module (302*a*) and LPC module (302*b*) to the baseband unit or application processor in the hybrid wireless device.

Still another aspect of the invention provides that the HPRF module (602*a*) in the wireless communications device (602) is allowed to use its associated antenna(s) (602*d*) to receive RF signal from the base station (606) (1500).

A further aspect of the invention provides that the received RF signal from the base station is further converted to data by the HPRF module (602*a*) from the base station (606) and the data is received by the PLPC wireless device (608) from the HPRF-LFC device (604) and is further routed to the wireless communications device (602) for further processing to extract the gains of receive spatial diversity and multiplexing diversity.

Another aspect of the invention provides that the system of the present invention further comprising a wireless range extender (1700) for extending the range of the low power communications devices comprising a LPC wireless range extended (1702) which comprises a processor (1702*a*), coupled to a LPC module (1702*b*), and is further coupled to a power source whereby the LPC module (1702*b*) will link with an LPC-enabled device on LPC-Link 1 and retransmit the received data after sufficient power-amplification via LPC-Link 2 and the LPC module (1702*b*) will link with another LPC-enabled device on LPC-Link 2 and retransmit the received data after sufficient power-amplification via LPC-Link 1.

Another aspect of the invention provides a method (2000) for reducing exposure of human to radio frequency radiation which comprises steps of pairing a first wireless device with a second wireless device through at least one pair of low power communications modules incorporated in the first and second wireless devices (2002); disabling transmission by one or more radio frequency modules in the first wireless device upon the said pairing (2004); and establishing communications between the first wireless device and one or more base stations through at least one radio frequency module in the second wireless device while maintaining the said pairing (2006).

Another aspect of the invention provides a method (2100) for reducing exposure of human to radio frequency radiation which comprises steps of pairing a low power communications device connected through a data interface port on a wireless device with a low power communications module incorporated in a network low power wireless device (2102); disabling transmission by one or more radio frequency modules in the wireless device upon the said pairing (2104); and establishing communications between the wireless device and a core network through the network low power wireless device connected to a broadband access network while maintaining the said pairing (2106).

Another aspect of the invention provides a method (2200) for reducing exposure of human to radio frequency radiation which comprises steps of pairing a low power communications module incorporated in a wireless device with a low power communications module incorporated in a network low power wireless device (2202); disabling transmission by one or more radio frequency modules in the wireless device upon the said pairing (2204); and establishing communications between the wireless device and a core network through the network low power wireless device connected to a broadband access network while maintaining the said pairing (2206).

Another aspect of the invention provides a method (2300) for reducing exposure of human to radio frequency radiation which comprises steps of pairing a first wireless device with a second wireless device through at least one pair of low power communications devices connected to the data interface ports available on the first and second wireless devices (2302); disabling transmission by one or more radio frequency modules in the first wireless device upon the said pairing (2304); and establishing communications between the first wireless device and one or more base stations through at least one radio frequency module in the second wireless device while maintaining the said pairing (2306).

The present invention consists of features and a combination of parts hereinafter fully described and illustrated in the accompanying drawings, it being understood that various changes in the details may be made without departing from the scope of the invention or sacrificing any of the advantages of the present invention.

BRIEF DESCRIPTION OF ACCOMPANYING DRAWINGS

To further clarify various aspects of some embodiments of the present invention, a more particular description of the invention will be rendered by references to specific embodiments thereof, which are illustrated in the appended drawings. It is appreciated that these drawings depict only typical embodiments of the invention and are therefore not to be considered limiting of its scope. The invention will be described and explained with additional specificity and detail through the accompanying drawings in which:

FIG. 1.0 illustrates the architecture of a conventional system of radio frequency transmission and reception from a wireless communications device to a base station.

FIG. 2.0 illustrates a architecture of the system of the present invention with a LPC wireless device and a HPRF-LPC device.

FIG. 3.0 illustrates a general architecture of the system of the present invention with a hybrid wireless device and a HPRF-LPC device with receive spatial diversity and receive spatial multiplexing.

FIG. 4.0 illustrates the architecture of the system of the present invention with a LPC wireless device and a hybrid wireless device.

FIG. 5.0 illustrates the architecture of the system of the present invention with two hybrid wireless devices.

FIG. 6.0 illustrates the architecture of the system of the present invention with a pluggable low power communications (PLPC) wireless device on a wireless communications device with a HPRF-LPC device.

FIG. 7.0 illustrates the architecture of the system of the present invention with pluggable low power communications (PLPC) wireless devices on two wireless communications devices whereby first wireless communications device is in communication with the second wireless communications device.

FIG. 8.0 illustrates the architecture of the system of the present invention with multiple hybrid wireless devices which are in communications with a multiuser HPRF-LPC device.

FIG. 9.0 illustrates the architecture of the system of the present invention with a LPC wireless device in communication with a Network LPC wireless device.

FIG. 10.0 illustrates the architecture of the system of the present invention with a hybrid wireless device in communication with a Network LPC wireless device.

FIG. 11.0 illustrates the architecture of the system of the present invention with a pluggable low power communications (PLPC) wireless device in communication with a Network LPC wireless device.

FIG. 12.0 illustrates the architecture of the system of the present invention with a hybrid wireless device in communication with a HPRF-LPC device with receive spatial diversity and receive spatial multiplexing.

FIG. 13.0 illustrates the architecture of the system of the present invention with two hybrid wireless devices with receive spatial diversity and receive spatial multiplexing.

FIG. 14.0 illustrates the architecture of the system of the present invention with multiple wireless devices communicating with a multiuser HPRF-LPC Devices with receive spatial diversity and receive spatial multiplexing.

FIG. 15.0 illustrates the architecture of the system of the present invention with a pluggable low power wireless device and an HPRF-LPC device with receive spatial diversity and receive spatial multiplexing.

FIG. 16.0 illustrates the architecture of the system of the present invention with PLPC wireless device on two wireless communications devices whereby first wireless communications device is in communication with the second wireless communications device with receive spatial diversity and receive spatial multiplexing.

FIG. 17.0 illustrates the architecture of the system of the present invention with LPC wireless range extender.

FIG. 18.0 illustrates example of locations of the devices of the present invention.

FIG. 19.0 illustrates additional example of locations of the devices of the present invention in a building and vehicle.

FIG. 20.0 is a flowchart illustrating a methodology of the present invention.

FIG. 21.0 is a flowchart illustrating another methodology of the present invention.

FIG. 22.0 is a flowchart illustrating a further methodology of the present invention.

FIG. 23.0 is a flowchart illustrating an additional methodology of the present invention.

DETAILED DESCRIPTION OF THE PREFERRED EMBODIMENTS

The present invention provides a system and method to reduce exposure of human to radio frequency radiation. In particular, the present invention decouples a wireless communications device (e.g. a cellular device) from its relatively high power radio frequency (HPRF) module by enabling the wireless communications device to communicate with a HPRF-LPC device via a low power communications link (LPC-Link). Hereinafter, this specification will describe the present invention according to the preferred embodiments. It is to be understood that limiting the description to the preferred embodiments of the invention is merely to facilitate discussion of the present invention and it is envisioned without departing from the scope of the appended claims. As provided in the system and method of the present invention, when the HPRF-LPC device or the other low power communications devices as described herein is placed relatively away from the user, RF exposure to human is automatically reduced. This correlates with the reduction of the amount of RF energy that is absorbed by the tissues in the human body and thereby reduces the effective SAR value of the wireless device.

The system and method of the present invention reduces the radio frequency (RF) exposure from the wireless devices to humans by reducing the amount of RF energy that is absorbed by humans. FIG. 1.0 illustrates the architecture of a conventional system of radio frequency transmission from a conventional wireless communications device to a base station whereby RF energy is transmitted directly between the wireless devices and base stations in a typical cellular base station environment. The base stations referred can be Wireless Wide Area Network (WWAN) base station and/or the Wireless Local Area Network Access Point (WLAN-AP) in the case of Wi-Fi hotspot.

Referring to FIG. 2.0, a general architecture of the system of the present invention is illustrated whereby the system (200) of the present invention for reducing exposure of human to radio frequency radiation comprising a low power communications (LPC) wireless device (202) in communication with a HPRF-LPC device (204). The LPC wireless device (202) comprises a low power communications (LPC) module (202a) coupled to the baseband unit or to the application processor in the LPC wireless device (202b) while the HPRF-LPC device (204) comprises a high power radio frequency (HPRF) module (204a) coupled to a processor (204b) and further coupled to a low power communications (LPC) module (204c). The LPC wireless device (202) is electronically paired with the HPRF-LPC device (204) through a low power communications link (LPC-Link) established between the LPC module in the LPC wireless device (202a) and the LPC module in the HPRF-LPC device (204c).

In the present invention, the HPRF-LPC device (204) separates the high power radio frequency (HPRF) module generally found in conventional wireless communications devices by enabling indirect communication between the LPC wireless device (202) and the base station via the HPRF-LPC device (204). The LPC module (202a) in the LPC wireless device (202) incorporates transceivers utilizing Ultra-Wideband technologies or novel wireless communications technologies that has relative lower SAR value compared to the HPRF Module (102a) of FIG. 1.0 and HPRF Module in all the other.

The power source (204d) of the HPRF-LPC device (204) as referred to in FIG. 2.0 is either battery powered or powered through external power source or powered through any of the multitude of energy harvesting techniques. The HPRF-LPC device (204) is placed at a distance away from the human head. The placement of the HPRF-LPC device (204) may include toe box, heel and sole in a footwear or may be placed on other parts of the body away from the head. The HPRF-LPC device (204) may also be placed further away from the human body such as in homes, buildings, vehicles and other strategic locations such that the communication between HPRF-LPC device (204) and the base station has good RF link while the LPC-Link is maintained.

Referring to FIG. 3.0, a general architecture of the system of the present invention is illustrated whereby the system (300) of the present invention for reducing exposure of human to radio frequency radiation comprising a hybrid wireless device (302) in communication with a HPRF-LPC device (304). The hybrid wireless device (302) comprises a high power radio frequency (HPRF) module (302a), and a low power communications (LPC) module (302b) coupled to a switch (302c) and further coupled to a control unit (302d) and to the baseband unit or to the application processor in the hybrid wireless device (302e) while the HPRF-LPC device (304) comprises a high power radio frequency (HPRF) module (304a) coupled to a processor (304b) and further coupled to a low power communications (LPC) module (304c). The hybrid wireless device (302) is electronically paired with the HPRF-LPC device (304) through low power communications link (LPC-Link) established between the LPC module (302b) in the hybrid wireless device (302b) and the LPC module (304c) in the HPRF-LPC device (304). The LPC module (304c) in the HPRF-LPC device (304) communicates with LPC-module (302b) in the hybrid wireless device (302). Upon pairing of the hybrid wireless device (302) and the HPRF-LPC device (304), direct communications from the HPRF module (302a) to the base station shall cease while communication between said hybrid wireless device (302) and base station (306) will be established via the HPRF-LPC Device (304). The control unit (302d) in the hybrid wireless device (302) is configured to control the switch (302c) which selects the HPRF Module (302a) and LPC Module (302b). The low power communications (LPC) modules (302b) incorporates transceivers utilizing ultra wideband (UWB) technologies is novel wireless communications technologies. The HPRF-LPC device (304) replicates the function of the HPRF module (302a) found in the hybrid wireless device (302). The power source (304d) of the HPRF-LPC device (304) is either battery powered or powered through power source or powered through any of the multitude of energy harvesting techniques.

In the present invention, the HPRF-LPC device (304) externalize the function of the HPRF Module (302a) found in the hybrid wireless device (302) by enabling indirect communication between the hybrid wireless device (302) and the base station via the HPRF-LPC device (304). The HPRF-LPC device (304) is placed at a distance away from the human head. The placement of the HPRF-LPC device (304) may include toe box, heel and sole in footwear or may be placed on other parts of the body away from the head. The HPRF-LPC device (304) may also be placed further away from the human body such as in homes, buildings, vehicles and other strategic locations with presence of radio frequency connectivity such that the communication between HPRF-LPC device (304) and the base station has good RF link(s) while the LPC-Link is maintained.

As illustrated in FIG. 3.0, the HPRF module (302a), control unit (302d) and the switch (302c) is removed from the hybrid wireless device (302) whereby the LPC module (302b) is now coupled directly to the baseband unit or to the application processor in the wireless device (302e) (900). The HPRF module (302a) in the hybrid wireless device (302) is allowed to use its associated antenna(s) (302g) to receive RF signal from the base station (306) while the control unit (302d) coupled with the switch (302c) will route the data received from both the HPRF module (302a) and LPC module (302b) to the baseband unit or to the application processor in the hybrid wireless device (302) for further processing to extract gains of receive spatial diversity and receive multiplexing diversity.

The HPRF module (302a) and HPRF module (304a) to simultaneously transmit to the base station to enhance the transmitter performance (e.g. spatial and multiplexing diversity gains). In this scenario the reduction of the SAR will be achieved if the total transmit power in the HPRF module (302a) is reduced. However, no reduction of SAR will be realized in the event the total transmit power in the HPRF module (302a) is not reduced. In the system (300) of the present invention, the low power communications (LPC) modules (302b) will contribute to the head Specific Absorption Rate (SAR) level of 0.16 watts per kilogram (W/kg) or lower averaged over one gram of tissue. Similar enhancement to the transmitter(s) performance will be achieved in the invention described in the FIG. 5.0, FIG. 6.0, FIG. 7.0, FIG. 8.0, FIG. 12.0, FIG. 13.0, FIG. 14.0, FIG. 15.0 and FIG. 16.0.

Referring to FIG. 4.0, the function of the HPRF-LPC device (204, 304) as described in FIG. 2.0 and FIG. 3.0 is replaced by a second hybrid wireless device (404). The control unit (404d) coupled to the switch (404c) will now route the data between the LPC wireless device (402) and the base station using the HPRF Module (404b). This is accomplished by the routing of the data between LPC module (404a) and HPRF module (404b) using the switch (404c) in the second hybrid wireless device (404). The hybrid wireless device (404) will be located far away from the head to minimize the RF exposure to humans.

Referring to FIG. 5.0, the system of the present invention may be configured by replacing the high power radio frequency-low power communications (HPRF-LPC) device (304) with a hybrid wireless device (504) which enables communication between two hybrid wireless devices (502, 504). As illustrated in FIG. 5.0, a first hybrid wireless device (502) communicates with the base station via a second hybrid wireless device (504). The first hybrid wireless device (502) is electronically paired with the second hybrid wireless device (504) through a low power communications link (LPC-Link) established between the LPC module in the hybrid wireless device (502b) and the LPC module (504b) in the second hybrid wireless device (504). Upon pairing of the first hybrid wireless device (502) and second hybrid wireless device (504), direct communications from the HPRF module (502a) to the base station (506) shall cease while communication between said first hybrid wireless device (502) and base station (506) will be established via the second hybrid wireless device (504). The control unit (502d) in the hybrid wireless device (502) is configured to control the switch (502c) which selects the HPRF Module (502a) and LPC Module (502b). The control unit (504d) coupled to the switch (504c) in the second hybrid wireless device will route the communications between the first hybrid wireless device (502) and the base station (506) via the second hybrid wireless device (504) using the HPRF Module (504a). This is accomplished by the routing of the data between LPC module (504b) and HPRF module (504a) using the switch (504c) in the second hybrid wireless device (504). The hybrid wireless device (504) will be located far away from the head to minimize the RF exposure to humans.

FIG. 6.0 illustrates the architecture of the system of the present invention with a pluggable low power communications (PLPC) wireless device (608) and HPRF-LPC device (604). The pluggable low power communications (PLPC) wireless device (608) is connected to the data interface port such as a universal serial bus, USB (602c) that is available on the wireless communications device (602). The PLPC wireless device (608) can send and receive speech, audio, text as well as video, images and electronic data (e.g. internet data) through the hands-free function available in the wireless communications device (602) to and from the wireless communications device (602) and the base station (606) via the HPRF-LPC device (604) which comprises a high power radio frequency (HPRF) module (604a) coupled to a processor (604b) and further coupled to a low power communications (LPC) module (604c). The wireless communications device (602) is paired with the HPRF-LPC device (604) through low power communications link (LPC-Link) established between the pluggable low power communications (PLPC) wireless device (608) and the LPC module (604c). Upon pairing of the PLPC wireless device (608) with the HPRF-LPC device (604), PLPC wireless device (608) will send control command(s) to the wireless communications device (602) through the data interface port, USB (602c) to disable its HPRF module (602a). This is implemented through a function in the wireless communications device (602) (e.g. operating-system (OS) functions or through preinstalled/installed apps). The establishment of communication between the wireless communications device (602) and the base station (606) via the HPRF-LPC device (604) further comprising authenticating user access to the base station through transmission via the HPRF module (602a) in the wireless communications device (602) when other authentication options are not available. The pluggable low power communications (PLPC) wireless device (608) further comprises an authentication module for authenticating user access with base station (606) via the HPRF-LPC device (604). The authentication module further comprises a subscriber identity module (SIM); said SIM may be a physical SIM or an electronic-SIM (eSIM). The authentication module further comprises a memory module to contain information for authenticating user access to a wireless LAN access point (WLAN-AP). Subscriber Identity Module (SIM) authentication or WLAN authentication information to be transmitted from the wireless communications device (602) as the pluggable low power communication (PLPC) wireless device (608) will receive authentication information from the wireless communications device (602) which is relayed by the PLPC wireless device (608) to HPRFLPC device (604) to authenticate user and the communications channel for accessing the base-station (606). In the event SIM authentication or WLAN user access information cannot be made available at the data interface port, USB (602c), the PLPC wireless device (608) will require its own valid SIM or WLAN user access module to authenticate with the base station. Alternatively, SIM authentication and WLAN authentication information will be transmitted via the HPRF module (602a) as and when necessary. It is also possible that SIM authentication and WLAN authentication can be performed in the HPRF-LPC device (604). The HPRF-LPC device (604) will be located far away from the head to minimize the RF exposure to humans. The HPRF module (604a) in the HPRF-LPC device (604) is replaced with a network interface module and the network interface module is connected to a broadband access network then to Internet and further to a core network of a service provider.

FIG. 7.0 illustrates the architecture of the system of the present invention with pluggable low power communications (PLPC) wireless device (708) whereby the HPRF-LPC device is replaced by a second wireless communications device (704) with a PLPC wireless device (710) connected. The pluggable low power communications (PLPC) wireless devices (708, 710) are connected to the data interface port such as a universal serial bus, USB (702c, 704c) that is available on the wireless communications devices (702, 704). The PLPC wireless devices (708, 710) can send and receive speech, audio, text as well as video, images and electronic data (e.g. internet data) through the hands-free function available in the wireless communications device (702) to and from the wireless communications device (702) and the base station (706) via the second wireless communications device (704) where the second PLPC wireless device (710) is attached. Upon pairing of the PLPC wireless device (708) with the second PLPC wireless device (710), the PLPC wireless device (708) will send control command(s) to the wireless communications device (702) to disable its HPRF module (702a). This is implemented through a function in the wireless communications device (702) (e.g. operating-system (OS) functions or through a preinstalled or installed apps). Subscriber Identity Module (SIM) authentication or WLAN user access authentication is transmitted from a first wireless communications device (702) to a second wireless communications device (704) to authenticate the communications channel with the relevant base-station. In the event SIM authentication or WLAN user access information cannot be made available at the data interface port, USB (702c), the second wireless communications device (704) will utilize its own valid SIM or WLAN user access to authenticate and communicate with the base station which is available in the second wireless communications device (704). The pluggable low power communications (PLPC) wireless device (708) further comprises an authentication module for authenticating user access with base station (706) via the second wireless communications device (704). The authentication module further comprises a subscriber identity module (SIM); said SIM maybe a physical SIM or electronic-SIM (eSIM). The authentication module further comprises a memory module to contain information for authenticating user access to a wireless LAN access point (WLAN-AP). Alternatively, SIM authentication and information for authenticating WLAN user access will be transmitted via the HPRF module (702a) to the base station (706) as and when necessary. A LPC-Link is further established between the PLPC wireless device (708) and the second PLPC wireless device (710) and the first wireless communications device (702) will transmit information for authenticating user access to base station when other authentication options are not available. The second wireless communications device (704) will be located far away from the head to minimize the RF exposure to humans.

Referring to FIG. 8.0, a Multiuser HPRF-LPC device (806) is introduced which functions to pair combinations of multiple wireless devices (802-804) consisting of hybrid wireless device, LPC wireless device and wireless device in combination with PLPC wireless device. The multiuser HPRF-LPC device (806) consists of two or more HPRF modules (806a-806b) coupled to a processor (806c), LPC module (806d) and power source (806e) allowing for one or more wireless devices (802-804) to pair with the HPRF-LPC device (806) via LPC-Links. The multiuser HPRF-LPC device (806) will be located far away from the head to minimize the RF exposure to humans.

FIGS. 9.0, 10.0 and 11.0 are general architectures of the system of the present invention whereby respective wireless devices (902, 1002 and 1102) is communicating with the cellular service provider via the respective Network LPC wireless device (904, 1004 and 1104) through a broadband access network (906, 1006, 1106), the internet (908, 1008 and 1108), and to the core network (910, 1010, 1110) of the service provider. As illustrated, the HPRF module (304a) in the HPRF-LPC device (304) is replaced with a network interface module (904, 1004, 1104). The network interface module (904a, 1004a, 1104a) is connected to a broadband access network then to the Internet and then to a core network of the service provider.

FIGS. 12.0, 13.0, 14.0 are general architectures of the system whereby the replication of the HPRF modules (1204a, 1304a, 1406a-1406b) in the wireless devices (1204, 1304, 1406) which incorporates the RF receive antennas, now allows the wireless devices (1202, 1302, 1402-1404) to use its antennas (1202g, 1302g, 1402a-1404a) to receive RF signal from the base stations (1206, 1306, 1408). In this architecture, the receive antennas are now separated by much larger distances as otherwise can be provided if the antennas are all within a conventional wireless device. In addition, the number of receive antennas have also increased (e.g. doubled). With the increased separation of the receive antennas and the increased number of receive antennas, the reliability and the throughput of the system will be improved by extracting the gains of spatial diversity and multiplexing diversity in the received RF signal. Conversely, the total transmit power of the base station can be reduced while the reliability and the throughput of the system is maintained by extracting the gains of spatial and multiplexing diversity in the received RF signal. This has the important effect of reducing the base stations transmit power especially nearby populated areas. The control units (1202d, 1302d, 1402d-1404d) coupled with the switches (1202c, 1302c, 1402e-1404e) will route the received data through two large separated antenna(s) pairs (1202g/1204e, 1302g/1304g, 1402a-1404a/1406f-1406g). As mentioned earlier and as illustrated in FIG. 13.0, the HPRF-LPC device (304) is replaced by a second hybrid wireless device (1300, 1304). The HPRF-LPC device comprises two or more HPRF modules allowing one or more wireless device to pair with the HPRF-LPC device via LPC-links (1400).

FIG. 15.0 illustrates the architecture of the system of the present invention with a pluggable low power communications (PLPC) wireless device (1508) and HPRF-LPC device (1504). A pluggable low power communications (PLPC) wireless device (1508) that is connected to the data interface port such as a universal serial bus, USB (1502c) that is available on a wireless communications device (1502). The PLPC wireless device (1508) can send and receive speech, audio, text as well as video and images and electronic data (e.g. internet data) through the hands-free function available in the wireless communications device (1502) to and from the wireless communications device (1502) and the base station (1506) via the HPRF-LPC device (1504). Upon pairing of the PLPC wireless device (1508) with the HPRF-LPC device (1504), the PLPC wireless device (1508) will send control command(s) to the wireless communications device (1502) to disable only the transmitter section of the HPRF module (1502a). This is implemented through the function in the wireless communications device (1502) (e.g. operating-system (OS) functions or through a preinstalled/installed apps). In this architecture, the receive antennas are now separated by much larger distances as otherwise can be provided if the antennas are all within a conventional wireless device. In addition, the number of receive antennas have also increased (e.g. doubled). With the increased separation of the receive antennas and the increased number of receive antennas, the reliability and the throughput of the system will be improved by extracting the gains of spatial diversity and multiplexing diversity in the received RF signal. Conversely, the total transmit power of the base station can be reduced while the reliability and the throughput of the system is maintained by extracting the gains of spatial and multiplexing diversity in the received RF signal. This has the important effect of reducing the base station transmits power especially nearby populated areas. Subscriber Identity Module (SIM) authentication or WLAN authentication information to be transmitted from the wireless communications device (1502) and relayed by the PLPC wireless device (1508) to HPRF-LP device (1504) to authenticate the communications channel with the base-station (1506). In the event SIM authentication or WLAN user access information cannot be made available at the data interface port, USB (1502c), the PLPC wireless device (1508) will require its own valid SIM or WLAN user access module to authenticate with the base station (1506). Alternatively, SIM authentication or WLAN user access authentication will be transmitted via the HPRF module (1502a) as and when necessary. The HPRF-LPC device (1504) will be located far away from the head to minimize the RF exposure to humans. The HPRF module in the wireless device is allowed to use its antennas to receive RF signal from the base station (1500).

FIG. 16.0 illustrates the architecture of the system of the present invention with a pluggable low power communications (PLPC) wireless device (1608) and a second a pluggable low power communications (PLPC) wireless device (1610) which are coupled to conventional wireless communication devices (1602, 1604) through data interface ports, universal serial bus, USB (1602c, 1604c). The PLPC wireless device (1608) sends and receives speech, audio, text, video, images and electronic data utilizing the hands-free function available in the wireless communications device (1602) to and from the base station (1606) via the PLPC wireless device (1610) coupled to wireless device (1604). Upon pairing of the PLPC wireless device (1608) with the second PLPC wireless device (1610), the first PLPC wireless device (1608) will send control commands to the wireless communications device (1602) to disable only the transmitter section of the HPRF module (1602a). This is implemented through the software function in the wireless communications device (1602) (e.g. operating-system (OS) functions or through a preinstalled/installed apps). Subscriber Identity Module (SIM) authentication or WLAN authentication will be transmitted from the wireless communications device (1602) and relayed by the PLPC wireless device (1608) to PLPC wireless device (1610) to wireless device (1604) to authenticate the communications channel with the base-station (1606). In the event SIM authentication or WLAN user access information cannot be made available at the data interface port, USB (1602c), the second wireless device (1604) will require its own valid SIM card or WLAN user access to authenticate and communicate with the base station. Alternatively, the PLPC wireless device (1608) will require its own valid SIM or WLAN user access module to authenticate with the base station (1606) otherwise, SIM authentication and WLAN user access authentication will be transmitted via the HPRF module (1602a) in the wireless communications device (1602) as and when necessary. The second wireless communications device (1604) will be located far away from the head to minimize the RF exposure to humans.

FIG. 17.0 illustrates architecture of a LPC wireless range extender (1702) that is used to extend the range of the LPC-Link (LPC-Link 1, LPC-Link 2) that is used to communicate between the hybrid wireless device, HPRF-LPC device, Multiuser HPRF-LPC device, LPC wireless device, PLPC wireless device, Network LPC wireless device and the LPC wireless range extender. The LPC wireless range extender (1702) consists of a processor (1702a), LPC module (1702b) and a power source (1702c). The LPC module (1702b) will link with an LPC-enabled device on LPC-Link 1 and retransmit the received data via LPC-Link 2. Simultaneously, the LPC module (1702b) will link with another LPC-enabled device on LPC-Link 2 and retransmit the received data via LPC-Link 1.

Referring to FIG. 18.0, example of locations of the HPRF-LPC device (1802a, 1802c, 1804, 1806) of the present invention is illustrated. The HPRF-LPC device can be placed in strategic locations either to be strapped, attached or to be inserted into a slot in a footwear (1802) heel (1802c) as well as being embedded or placed in the sole of footwear. Further, the HPRF-LPC can be placed in the toe box (1802a) of footwear whereby the design of the toe box is made with sufficient toe allowance for placement of the HPRF-LPC device and with appropriate RF shielding (1802b, 1802d) between the parts of the body and the HPRF-LPC device. The shielding can also be in the form of RF shielding fabrics which can take the form of socks, clothing, etc. The HPRF-LPC device is to be detached to enable charging of the battery in the HPRF-LPC device or to be reused or to be used in different location. The power source for the HPRF-LPC can be battery powered or powered through any of the multitude of energy harvesting techniques such as kinetic energy from user motion in the footwear that generates and store electricity. Further, the HPRF-LPC device can be strapped or held in place in other parts of the human body while ensuring sufficient RF shielding or physical separation from the head and body for reduction of RF radiation. The HPRF-LPC device could also be placed in backpacks, briefcases, handbags and other carrying cases that are physically separated from the head and body to reduce the SAR value.

Referring to FIG. 19.0, the HPRF-LPC device (1904, 1906) may be placed in buildings (1912) or vehicles (1910). The HPRF-LPC device (1904, 1906) can also be placed on poles and other structure accessible relatively distance away from humans to minimize the RF exposure. These locations can also be selected such as it has minimum radio frequency (RF) blockage to the Wireless Wide Area Network, WWAN base station or to the Wireless Local Area Network Access Point (WLAN-AP) in the case of WiFi hotspot.

Reference is now made to FIG. 20.0 which illustrates the methodology of the present invention. As illustrated in FIG. 20.0, in reducing exposure of human to radio frequency radiation, the methodology (2000) employed in the present invention pairing a first wireless device with a second wireless device through at least one pair of low power communications modules incorporated in the first and second wireless devices (2002); disabling transmission by one or more radio frequency modules in the first wireless device upon the said pairing (2004); and establishing communications between the first wireless device and one or more base stations through at least one radio frequency module in the second wireless device while maintaining the said pairing (2006).

Reference is now made to FIG. 21.0 which illustrates the methodology of the present invention. As illustrated in FIG. 21.0, in reducing exposure of human to radio frequency radiation, the methodology (2100) employed in the present invention pairing a low power communications device connected through a data interface port on a wireless device with a low power communications module incorporated in a network low power wireless device (2102); disabling transmission by one or more radio frequency modules in the wireless device upon the said pairing (2104); and establishing communications between the wireless device and a core network through the network low power wireless device connected to a broadband access network while maintaining the said pairing (2106).

Reference is now made to FIG. 22.0 which illustrates the methodology of the present invention. As illustrated in FIG. 22.0, in reducing exposure of human to radio frequency radiation, the methodology (2200) employed in the present invention pairing a low power communications module incorporated in a wireless device with a low power communications module incorporated in a network low power wireless device (2202); disabling transmission by one or more radio frequency modules in the wireless device upon the said pairing (2204); and establishing communications between the wireless device and a core network through the network low power wireless device connected to a broadband access network while maintaining the said pairing (2206).

Reference is now made to FIG. 23.0 which illustrates the methodology of the present invention. As illustrated in FIG. 23.0, in reducing exposure of human to radio frequency radiation, the methodology (2300) employed in the present invention pairing a first wireless device with a second wireless device through at least one pair of low power communications devices connected to the data interface ports available on the first and second wireless devices (2302); disabling transmission by one or more radio frequency modules in the first wireless device upon the said pairing (2304); and establishing communications between the first wireless device and one or more base stations through at least one radio frequency module in the second wireless device while maintaining the said pairing (2306).

The present invention increases the distance between the active HPRF module along with the antennas away from the head or body of a human, which directly contributes to the reduction of the RF radiation exposure that originates from the internal HPRF module located within conventional wireless devices.

Evolvement of technology has led to design tradeoff between size and performance in the antenna design due to inherent space constraints within the conventional wireless device. This particularly relates to the complexities of antenna design as well as space constraint in certain wireless devices, which has reduced in size with the evolution of technology that makes devices smaller and compact in size. Further advantage in the present invention is observed by replicating the HPRF module along with the antennas for it to be operating out of the wireless device whereby the traditional constraints of antennas design can be mitigated, as there can be additional space available in and around the HPRF-LPC device.

Close proximity of the wireless device such as being held close to the head or placed close to the body can have unintended consequences in terms of the RF transmission and reception performance whereby the radiation efficiency can be reduced when the wireless device is placed close to the body or to the head. Reduction in the radiation efficiency can influence the quality of the communications between the wireless device and the base stations which is translated to reduced data throughput and increased dropped calls. Simultaneously this could also lead to reduction in battery life in the wireless device as the wireless device typically would compensate for the reduction in the radiation efficiency by increasing its RF output power. Further, placement of HPRF-LPC device in strategic locations such as near building windows or even in rooftops, which leads to reduced RF obstructions to the base stations which in turn contributes to improved RF coverage. The improved RF coverage will be converted to higher quality communications for the user of the wireless device which is further converted to increased data throughput and reduced dropped calls rate.

In this architecture, the receive antennas are now separated by much larger distances as otherwise can be provided if the antennas are all within a conventional wireless device. In addition, the number of receive antennas have also increased (e.g. doubled). With the increased separation of the receive antennas and the increased number of receive antennas, the reliability and the throughput of the system will be improved by extracting the gains of receive spatial diversity and receive spatial multiplexing in the received RF signal. Conversely, the total transmit power of the base station can be reduced while the reliability and the throughput of the system is maintained by extracting the gains of receive spatial diversity and receive spatial multiplexing in the received RF signal. This has the important effect of reducing the base station transmit power especially nearby populated areas.

The present invention increase the RF link efficiency between the wireless device and the base station hence contributing to the reduced capital expenditure for the network service providers as the network service providers do not need to incur investments to penetrate locations which are unreachable.

Unless the context requires otherwise or specifically stated to the contrary, integers, steps or elements of the invention recited herein as singular integers, steps or elements clearly encompass both singular and plural forms of the recited integers, steps or elements.

Throughout this specification, unless the context requires otherwise, the word "comprise", or variations such as "comprises" or "comprising", will be understood to imply the inclusion of a stated step or element or integer or group of steps or elements or integers, but not the exclusion of any other step or element or integer or group of steps, elements or integers. Thus, in the context of this specification, the term "comprising" is used in an inclusive sense and thus should be understood as meaning "including principally, but not necessarily solely".

The invention claimed is:

1. A system (300) for reducing exposure of human to radio frequency radiation, comprising:

a hybrid wireless device (302) which comprises a high power radio frequency (HPRF) module (302a) that is connected to one or more antennas associated with the HPRF module (302a), and a low power communications (LPC) module (302b) that is connected to one or more antenna associated with the LPC module (302b), the HPRF module (302a) and the LPC module (302b) being coupled to a switch (302c), wherein the switch being coupled to a control unit (302d) and to a baseband unit or a processor (302e); and a high power radio frequency-low power communications (HPRF-LPC) device (304) which comprises a high power radio frequency (HPRF) module (304a) that is connected to one or more antennas associated with the HPRF module (304a), the HPRF module (304a) being coupled to a processor (304b) and further coupled to a low power communications (LPC) module (304c) that is connected to one or more antennas associated with the LPC module (304c);

wherein the hybrid wireless device (302) is paired with the HPRF-LPC device (304) through a low power communications link (LPC-Link) established between the LPC module (302b) in the hybrid wireless device (302) and the LPC module (304c) in the HPRF-LPC device (304), whereby upon this pairing the control unit (302d) is configured to control the switch (302c) to select the LPC module (302b) of the hybrid wireless device (302) and to disable transmitter(s) in the HPRF module (302a) of the hybrid wireless device (302) so that communications between the hybrid wireless device (302) and a base station (306) will be via the HPRF module (304a) in the HPRF-LPC Device (304).

2. The system (300) according to claim 1, wherein the HPRF-LPC device (304) replicates the function of the HPRF module (302a) found in the hybrid wireless device (302).

3. The system (300) according to claim 1, wherein the LPC-module (304c) in the HPRF-LPC device (304) communicates with the LPC-module (302b) in the hybrid wireless device (302).

4. The system (300) according to claim 1, wherein the low power communications (LPC) modules (302b, 304c) incorporates transceivers utilizing ultra wideband (UWB) technologies.

5. The system (300) according to claim 1, wherein the low power communications (LPC) module (302b) in the hybrid wireless device (302) will contribute to a head of a human user of the hybrid wireless device (302) a Specific Absorption Rate (SAR) of 0.16 watts per kilogram (W/kg) or lower, as averaged over one gram of tissue.

6. The system (300) according to claim 1, wherein when the HPRF-LPC device (304) is placed at a distance away from a head of a user of the hybrid wireless device (302), the placement of the HPRF-LPC device (304) may be placed in a heel of footwear, a sole of footwear, within a toe box of footwear, or may be placed on other parts of the body of the human user with RF shielding or physical separation to reduce RF exposure from the HPRF-LPC device (304).

7. The system (300) according to claim 6, wherein the HPRF-LPC device (304) may include placement in buildings, poles, structures or vehicles with presence of radio frequency connectivity from one or more base stations (306) to reduce RF exposure from the HPRF-LPC device (304).

8. The system (300) according to claim 1, wherein the HPRF-LPC device (304) is battery powered, powered through an external regulator, or chargeable through energy harvesting techniques (304d).

9. The system (300) according to claim 1, wherein the control unit (302d) in the hybrid wireless device (302) is configured to control the switch (302c) to select the HPRF Module (302a) and the LPC Module (302b) in the hybrid wireless device (302) upon establishment of the low power communications (LPC) link.

10. The system (300) according to claim 1, wherein when the hybrid wireless device (302, 202) excludes its HPRF module (302a), switch (302c) and control unit (302d), the LPC module (302b, 202a) in the hybrid wireless device is coupled to a baseband unit or a processor (302e) in the hybrid wireless device, thereby allowing for the pairing between the LPC module in the hybrid wireless device and the LPC module in the HPRF-LPC device through a low power communications (LPC) link such that communications between the hybrid wireless device (202) and the base station (206) is through the HPRF module (204a) in the HPRF-LPC device (204).

11. The system (200) according to claim 10, wherein when the HPRF-LPC device (204) is replaced by a second hybrid wireless device (400, 404), the switch in the second hybrid wireless device (404) will route data between its LPC module (404a) and its HPRF-module (404b) directly or via a baseband unit or via a processor (404e) in the second hybrid wireless device.

12. The system (300) according to claim 1, wherein the high power radio frequency-low power communications (HPRF-LPC) device (304) is replaced with a second hybrid wireless device (504) which allows communication between the hybrid wireless device (302, 502) and the second hybrid wireless device (504) through a low power communications (LPC) link established between the LPC module (502b) in the hybrid wireless device (302, 502) and the LPC module (504b) in the second wireless device (504), wherein communications between the hybrid wireless device (302, 502) and the base station (306, 506) is via the HPRF module (504a) in the second hybrid wireless device (504), wherein a switch (504c) in the second hybrid wireless device will route the data between the LPC module (504b) and the HPRF-Module (504a) in the second hybrid wireless device directly or via the baseband unit or via the processor (504e) in the second hybrid wireless device (504).

13. The system (300) according to claim 1, wherein the processor (304b, 806c) in the HPRF-LPC device (304, 806) is coupled to one or more HPRF modules (304a, 806a-806b) allowing for one or more hybrid wireless devices (302, 802-804) to pair with the HPRF-LPC device (806) through one or more low power communications (LPC) links established between one or more LPC modules (802c-804c) in one or more hybrid wireless devices (302, 802-804) with the LPC module (806d) in the HPRF-LPC device (304, 806) allowing for one or more hybrid wireless devices (802-804) to communicate with one or more base stations (808) through one or more associated HPRF modules (806a-806b) in the HPRF-LPC device (806).

14. The system (300) according to claim 1, wherein the HPRF module (304a) in the HPRF-LPC device (304) is replaced with a network interface module (1004a).

15. The system (1000) according to claim 14, wherein the network interface module (1004a) of a HPRF-LPC device (1004) is connected to a broadband access network (1006) and then to the Internet and then to a core network of a service provider, wherein data to and from the core network is routed through the Internet (1008) then through the broadband access network (1006), and in the HPRF-LPC device (1004) through the network interface module (1004a) then through a processor (1004b) then through the LPC module (1004c), then through a low power communications link (LPC-Link) setup between the LPC module (1004c) in the HPRF-LPC device (1004) and the LPC module (1002b) in the hybrid wireless device (1002), and then through the switch (1002c) in the hybrid wireless device and then to a baseband unit or to a processor (1002e) in the hybrid wireless device (1002).

16. The system (1000) according to claim 15, wherein when the hybrid wireless device (1002) excludes its HPRF module (1002a), its control unit (1002d) and its switch (1002c), wherein the LPC module (1002b, 902a) in the hybrid wireless device (1002, 902) is connected to the baseband unit or to the processor (1002e, 902b) in the hybrid wireless device (1002, 902), wherein the data to and from the core network (910) in routed through the internet (908) then through the broadband access network (906), and in the HPRF-LPC Device (904) then through the network interface module (904a) then through the processor (904b) and then through the LPC module (904c), then through the low power communications (LPC) link established between the LPC module (904c) in the HPRF-LPC device (904) and the LPC module (902a) in the hybrid wireless device (902), and then to the baseband unit or to the processor (902b) in the hybrid wireless device (902).

17. The system (300) according to claim 9, wherein the switch (302c) will route the data received from the base station (306) in the HPRF module (302a) and the data received in the LPC module (302b) in the hybrid wireless device (302) to the baseband unit or to the processor (302e) in the hybrid wireless device (302) to extract any gains of receive spatial diversity and receive spatial multiplexing.

18. The system (300) according to claim 9 and the system (500) according to claim 12, wherein the switch (502c, 1302c) in the hybrid wireless device (502, 1302) will route the data received from the base station (506, 1306) in the HPRF module (502a, 1302a) and the data received in the LPC module (502b, 1302b) in the hybrid wireless device (502, 1302), to the baseband unit or to the processor (502e, 1302e) in the hybrid wireless device (502, 1302) to extract any gains of receive spatial diversity and receive spatial multiplexing (1300).

19. The system (300) according to claim 9 and the system (800) according to claim 13, wherein the switches (802e-804e, 1402e-1404e) will route the data received from the base station (808, 1408) in the HPRF modules (802b-804b, 1402b-1404b) and the data received in the LPC modules (802c-804c, 1402c-1404c) in the corresponding hybrid wireless devices (802-804, 1402-1404) to the baseband units or to the processors (802f-804f, 1402f-1404f) in the hybrid wireless devices (802-804, 1402-1404) to extract any gains of receive spatial diversity and receive spatial multiplexing.

20. A system (600) for reducing exposure of human to radio frequency radiation, comprising:
a pluggable low power communications (PLPC) wireless device (608) connected to a data interface port (602c) that is available on a wireless communications device (602), wherein the wireless communications device comprising a high power radio frequency (HPRF) module (602a) connected to one or more antennas (602d) associated with the HPRF module (602a), the HPRF module being connected to a baseband unit or a processor (602b) and further connected to the data interface port (602c); and
a high power radio frequency-low power communications (HPRF-LPC) device (604) which comprises a high power radio frequency (HPRF) module (604a) that is connected to one or more antennas associated with the HPRF module (604a), the HPRF module (604a) coupled to a processor (604b) and further coupled to a low power communications (LPC) module (604c) that is connected to one or more antennas associated with the LPC module (604c);

wherein the pluggable low power communications (PLPC) wireless device (608) is paired with the HPRF-LPC device (604) through a low power communications (LPC) link (LPC-Link) established between the pluggable low power communications (PLPC) wireless device (608) and the LPC module (604c) in the HPRF-LPC device (604), wherein upon establishment of the LPC-Link, the pluggable low power communications (PLPC) wireless device (608) will send control command(s) to the wireless communications device (602) through the data interface port (602c) to disable the HPRF module (602a) in the wireless communications device (602) such that direct communications between the HPRF module (602a) in the wireless communications device (602) an a base station (606) shall cease while communications between the wireless communications device (602) and the base station (606) will be established through the HPRF module (604a), then through processor (604b) and then through the LPC module (604c) in the HPRF-LPC device (604), then via the LPC-Link, then through the pluggable low power communications (PLPC) wireless device (608) connected to the data interface port (602c) on the wireless communications device (602), then through the data interface port (602c), and then to the processor or to the baseband unit (602b) in the wireless communications device (602).

21. The system (600) according to claim 20, wherein the pluggable low power communications (PLPC) wireless device (608) can send and receive to and from the wireless communications device (602) through the data interface port (602c) one or more of speech, audio, text, video, images and electronic data.

22. The system (600) according to claim 20, wherein the pluggable low power communications (PLPC) wireless device (608) can receive authentication information from the wireless communications device (602) which is relayed by the pluggable low power communications (PLPC) wireless device (608) to the HPRF-LPC device (604) via the LPC-Link, and in the HPRF-LPC device (604) to the LPC module (604c) then to the processor (604b) and then to the HPRF module (604a), and then to the base station (606) to authenticate user access.

23. The system (600) according to claim 20, wherein the pluggable low power communications (PLPC) wireless device (608) further comprises an authentication module for authenticating user access with base station (606) via the HPRF-LPC device (604).

24. The system (600) according to claim 23, wherein the authentication module further comprises a subscriber identity module (SIM); wherein the SIM is one of a physical or electronic SIM or one or more combinations thereof.

25. The system (600) according to claim 23, wherein authentication module further comprises a memory module that contains information for authenticating user access to a wireless LAN access point (WLAN-AP).

26. The system (600) according to claim 20, wherein establishment of communications between said wireless communications device (602) and the base station (606) via the HPRF-LPC Device (604) further comprises authenticating user access with the base station through transmission via the HPRF module (602a) in the wireless communications device (602) when other authentication options are not available.

27. The system (600) according to claim 20, wherein the HPRF-LPC device (604) is replaced by a second wireless communications device (704), wherein a second pluggable low power communications (PLPC) wireless device (710) is connected to a data interface port (704c) on the second wireless communications device.

28. The system (700) according to claim 27, wherein a low power communications (LPC) link (LPC-Link) is further established between the pluggable low power communications (PLPC) wireless device (708) and the second pluggable low power communications (PLPC) wireless device (710).

29. The system (700) according to claim 27, wherein the second wireless communications device (704) can transmit information for authenticating user access to the base station when other authentication options are not available.

30. The system (700) according to claim 29, wherein HPRF module (702a, 1602a) in the wireless communications device (702, 1602) will receive the data from the base station (706, 1606) and route it to the baseband unit or to a processor (702b, 1602b) in the wireless communications device (702, 1602) along with the data received from the PLPC wireless device (708, 1608) connected to a data interface port (702c, 1602c) on the wireless communications device (702, 1602) to the baseband unit or to the processor (702b, 1602b) of the wireless communications device (702, 1602), wherein these data will be processed to extract any gains of receive spatial diversity and spatial multiplexing (1600).

31. The system (600) according to claim 20, wherein HPRF module (604a) in the HPRF-LPC device (604) is replaced with a network interface module (1100, 1104a), wherein the network interface module (1104a) is connected to a broadband access network (1106), then to the Internet (1108), and then to a core network (1110) of a service provider wherein data to and from the core network (1110) is routed through the Internet (1108) then through the broadband access network (1106), and in HPRF-LPC device (1104) through the network interface module (1104a) then through a processor (1104b) and then through the LPC module (1104c), then through a low power communications link (LPC-Link) (1100) then through the pluggable low power communications (PLPC) wireless device (1114) connected to the data interface port (1102c) on the wireless communications device (1102), then through the data interface port (1102c), and then to the processor or to the baseband unit (1102b) in the wireless communications device (1102).

32. The system (600) according to claim 20, wherein the HPRF module (602a) in the wireless communications device (602) is allowed to use its associated antenna(s) (602d) to receive RF signal from the base station (606) (1500).

33. The system (1500) according to claim 32, wherein the received RF signal from the base station (1506) is converted to data in the baseband unit or in the processor (1502b) or in the HPRF module (1502) of the wireless communications device (1502) and the data that is received by the pluggable low power communications (PLPC) wireless device (1508) from the HPRF-LPC device (1504) through the LPC-Link established between the pluggable low power communications (PLPC) wireless device (1508) and the LPC module (1504c) in the HPRF-LPC device (1504) is further routed to the baseband unit or processor in the wireless communications device (1502) for further processing to extract any gains of spatial diversity and spatial multiplexing.

34. The system (300) or (600) according to claim 1 or claim 20 further comprising a LPC wireless range extender (1700, 1702) which comprises a processor (1702a), coupled to a LPC module (1702b) associated with its antenna(s), wherein the LPC module (1702b) is further coupled to a power source (1702c), wherein the LPC wireless range extender (1700) is for extending the operating range of LPC-enabled devices or modules, wherein the LPC-enabled devices or modules comprising of low power communications (LPC) module or PLPC wireless devices or another LPC wireless range extender (1702).

35. The system (1700) according to claim 34, wherein the LPC module (1702b) in the LPC wireless range extender (1702) will pair with a first LPC-enabled device or module on an antenna in the LPC wireless range extender (1700, LPC-Link 1) and retransmit the received data from the first LPC-enabled device or module after sufficient power-amplification on an antenna in the LPC wireless range extender (1700, LPC-Link 2) to a second LPC-enabled device or module.

36. The system (1700) according to claim 34 or claim 35 wherein, the LPC module (1702b) in the LPC wireless range extender (1702) will pair with a second LPC-enabled device or module on an antenna in the LPC wireless range extender (1700, LPC-Link 2) and retransmit the received data from the second LPC-enabled device or module after sufficient power-amplification on an antenna in the LPC wireless range extender (1700, LPC-Link 1) to a first LPC-enabled device or module.

37. A method (2000) for reducing exposure of human to radio frequency radiation comprising the steps of:
pairing a first wireless device with a second wireless device through at least one pair of low power communications modules incorporated in the first and second wireless devices (2002);
disabling transmission by one or more radio frequency modules in the first wireless device with one or more base stations upon the said pairing (2004); and
establishing communications between the first wireless device and one or more base stations through at least one radio frequency module in the second wireless device while maintaining the said pairing (2006).

38. A method (2100) for reducing exposure of human to radio frequency radiation comprising the steps of:
pairing a low power communications device connected to a data interface port on a wireless device with a low power communications module incorporated in a network low power wireless device (2102);
disabling transmission by one or more radio frequency modules in the wireless device with one or more base stations upon the said pairing (2104); and
establishing communications between the wireless device and a core network through the network low power wireless device connected to a broadband access network while maintaining the said pairing (2106).

39. A method (2200) for reducing exposure of human to radio frequency radiation comprising the steps of:
pairing a low power communications module incorporated in a wireless device with a low power communications module incorporated in a network low power wireless device (2202);
disabling transmission by one or more radio frequency modules in the wireless device with one or more base stations upon the said pairing (2204); and
establishing communications between the wireless device and a core network through the network low power wireless device connected to a broadband access network while maintaining the said pairing (2206).

40. A method (2300) for reducing exposure of human to radio frequency radiation comprising the steps of:
pairing a first wireless device with a second wireless device through at least one pair of low power communications devices connected to the data interface ports available on the first and second wireless devices (2302);
disabling transmission by one or more radio frequency modules in the first wireless device with one or more base stations upon the said pairing (2304); and
establishing communications between the first wireless device and one or more base stations through at least one radio frequency module in the second wireless device while maintaining the said pairing (2306).

* * * * *

UNITED STATES PATENT AND TRADEMARK OFFICE
CERTIFICATE OF CORRECTION

PATENT NO.       : 10,034,297 B2
APPLICATION NO.  : 15/133868
DATED            : July 24, 2018
INVENTOR(S)      : Rakuram Gandhi It is certified that error appears in the above-identified patent and that said Letters Patent is hereby corrected as shown below:

On the Title Page

Item (73), Assignee, change "Rakuram Ghandi" to –Rakuvisions LLC–

Signed and Sealed this
Sixteenth Day of July, 2019

Andrei Iancu
*Director of the United States Patent and Trademark Office*